United States Patent
Pachon et al.

(10) Patent No.: US 12,223,521 B1
(45) Date of Patent: Feb. 11, 2025

(54) DETERMINING A TOPOLOGY FOR DISTRIBUTION OF SERVICES USING DEMAND AGGREGATION

(71) Applicant: Amazon Technologies, Inc., Seattle, WA (US)

(72) Inventors: Julian Enrique Pachon, Austin, TX (US); Marc Joseph Anderson, Driftwood, TX (US); Bhargav Kunkulagunta, Hyderabad (IN); Nader M. Kabbani, Bellevue, WA (US); Karthik Charan Konduri, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 17/489,113

(22) Filed: Sep. 29, 2021

Related U.S. Application Data

(60) Provisional application No. 63/222,337, filed on Jul. 15, 2021.

(51) Int. Cl.
  *G06Q 30/0204* (2023.01)
  *G06N 20/00* (2019.01)
  (Continued)

(52) U.S. Cl.
  CPC ......... *G06Q 30/0205* (2013.01); *G06N 20/00* (2019.01); *G06Q 10/0631* (2013.01); *G06Q 10/08* (2013.01); *G06Q 30/0206* (2013.01)

(58) Field of Classification Search
  CPC ............... G06Q 10/08; G06Q 10/0631; G06Q 30/0205; G06Q 30/0206; G06N 20/00
  See application file for complete search history.

(56) References Cited

U.S. PATENT DOCUMENTS

| | | | |
|---|---|---|---|
| 10,826,836 B1* | 11/2020 | Kannan | H04L 47/83 |
| 2014/0005849 A1* | 1/2014 | Sun | H02J 3/00 700/291 |

(Continued)

OTHER PUBLICATIONS

"Design of Networks Minimizing Topology and Equipment Costs", by Benjamin K. Chen, The Department of Electrical Engineering of Stanford University, Sep. 2007. (Year: 2007).*

(Continued)

*Primary Examiner* — Pan G Choy
(74) *Attorney, Agent, or Firm* — Athorus, PLLC

(57) ABSTRACT

Described are systems and methods directed to determining a topology for the efficient allocation and distribution of a service to customers that are distributed over a geographic area. For example, the topology can facilitate the planning, scheduling, and allocation of resources for the efficient provisioning of services to customers at locations distributed over the geographic area. Certain input parameters and/or constraints associated with the provisioning of the service may be processed to define a cost function that may represent a total cost of providing the service while ensuring that none of the constraints are exceeded. The cost function may be optimized to determine a lowest relative cost for providing the services to the customers using the various mechanisms and/or types of resources, and a topology associated with the optimized cost function can be generated to specify how the service should be provided to satisfy the demand.

18 Claims, 17 Drawing Sheets

(51) Int. Cl.
*G06Q 10/0631* (2023.01)
*G06Q 10/08* (2024.01)
*G06Q 30/0201* (2023.01)

(56) References Cited

U.S. PATENT DOCUMENTS

| | | | | |
|---|---|---|---|---|
| 2015/0029868 A1* | 1/2015 | Mahasenan | ......... | H04L 43/0817 370/242 |
| 2016/0191194 A1* | 6/2016 | Wood | .................. | H04J 14/0267 398/58 |
| 2021/0188434 A1* | 6/2021 | Blake | ..................... | G05D 1/102 |
| 2022/0187847 A1* | 6/2022 | Cella | ....................... | G06Q 50/40 |
| 2022/0318709 A1* | 10/2022 | Peng | ......................... | G06N 3/09 |

OTHER PUBLICATIONS

"Optimal Design and Planning of an Integilgent Distribution Network", by Zhenghui Zhao, Schedule of Electrical and Electronic Engineering Electrical Energy and Powe Systems Group, The University of Manchester, 2019. (Year: 2019).*

* cited by examiner

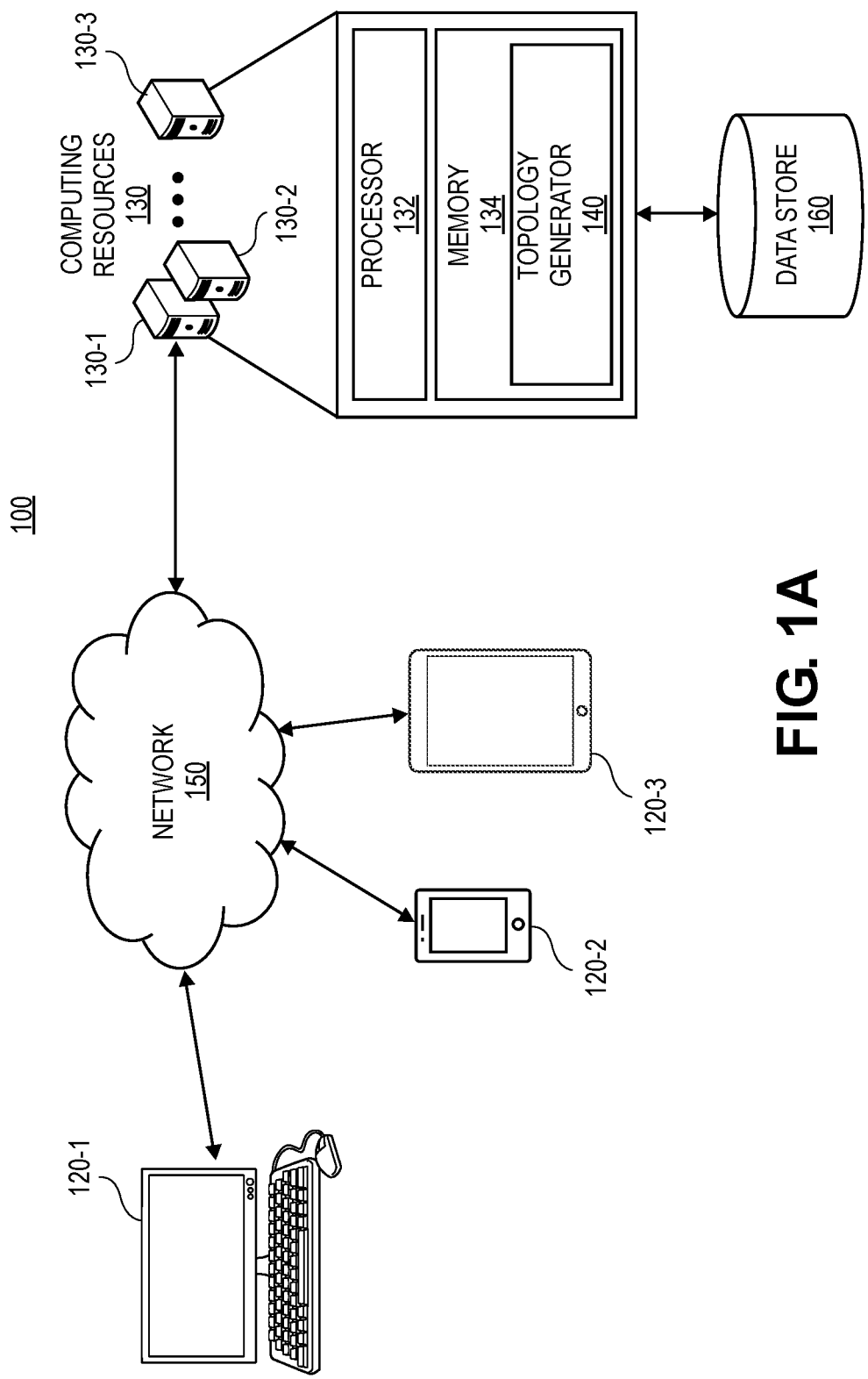

| TYPE | NAME | MIN | MAX | SUPPORT OTHER SITES | BASE COST | COST PER DEMAND |
|---|---|---|---|---|---|---|
| ONSITE | FACILITY A | 0 | 500 | Y | $1,000 | $45 |
| ONSITE | FACILITY B | 100 | 10,000 | N | $1,500 | $45 |
| HUB & SPOKE | DRUGSTORE A | 50 | 2,500 | N/A | $5,000 | $50 |
| THIRD PARTY | · · · · · | 50 | 5,000 | N/A | N/A | $70 |
| · · · · · | · · · · · | · · · · · | · · · · · | · · · · · | · · · · · | · · · · · |

702 → ONSITE
704 → ONSITE
706 → HUB & SPOKE
708 → THIRD PARTY

| SELF-REPORTING OF SERVICE ← 752 | ASSIGNED EVENT ← 754 | ALTERNATE EVENTS ← 756 |
|---|---|---|
| SERVICE RECEIVED?<br><br>o YES<br><br>o NO | FACILITY Z<br>ANY TOWN, USA<br>SEPT. 21 - SEPT. 24 | FACILITY X<br>SOME TOWN, USA<br>SEPT. 27 - SEPT. 30<br><br>FACILITY Y<br>A TOWN, USA<br>OCT. 15 - OCT. 21 |

TOPOLOGY GENERATION SYSTEM

902 — REGION: [▼]
904 — LOCATIONS: [▼]
906 — SERVICE RECIPIENTS: [▼]
908 — SERVICE TYPE: [▼]

910 — ALLOW HUB AND SPOKE: ☐
       ONSITE
912 — ALLOW HUB AND SPOKE: ☐
       NON-ONSITE
914 — INCLUDE THIRD PARTY PROVIDERS: ☐
916 — MAXIMUM TRAVEL DISTANCE: [▼]

FIG. 9

DETERMINING A TOPOLOGY FOR DISTRIBUTION OF SERVICES USING DEMAND AGGREGATION

CROSS-REFERENCE TO PRIOR APPLICATIONS

This application claims priority to and the benefit of U.S. Provisional Patent Application No. 63/222,337, filed on Jul. 15, 2021 and entitled DETERMINING A TOPOLOGY FOR DISTRIBUTION OF SERVICES USING DEMAND AGGREGATION, which is hereby incorporated by reference herein in its entirety.

BACKGROUND

Companies are routinely presented with the issue of how to efficiently schedule, allocate resources, and provide services. For example, companies may need to determine how to schedule and allocate their resources in the dissemination and provisioning of their services to customers located across a geographic area. Although these determinations may be simple in situations where there may be a relatively small number of customers and/or resources, the customers are confined to a small geographic area, and the like, efficiently scheduling services can be challenging and poor scheduling and/or allocation of resources may result in additional cost, lost efficiencies, dissatisfaction of customers, etc. Further, the efficient scheduling and allocation of resources can become increasingly difficult where there is a large number of customers, the allocation of resources is not easily relocated, and the like.

BRIEF DESCRIPTION OF THE DRAWINGS

FIG. 1A is an illustration of an exemplary computing environment, according to exemplary embodiments of the present disclosure.

FIGS. 7A and 7B are illustrations of exemplary user interfaces, according to exemplary embodiments of the present disclosure.

FIG. 9 is an illustration of an exemplary user interface, according to exemplary embodiments of the present disclosure.

DETAILED DESCRIPTION

Figure 1B:
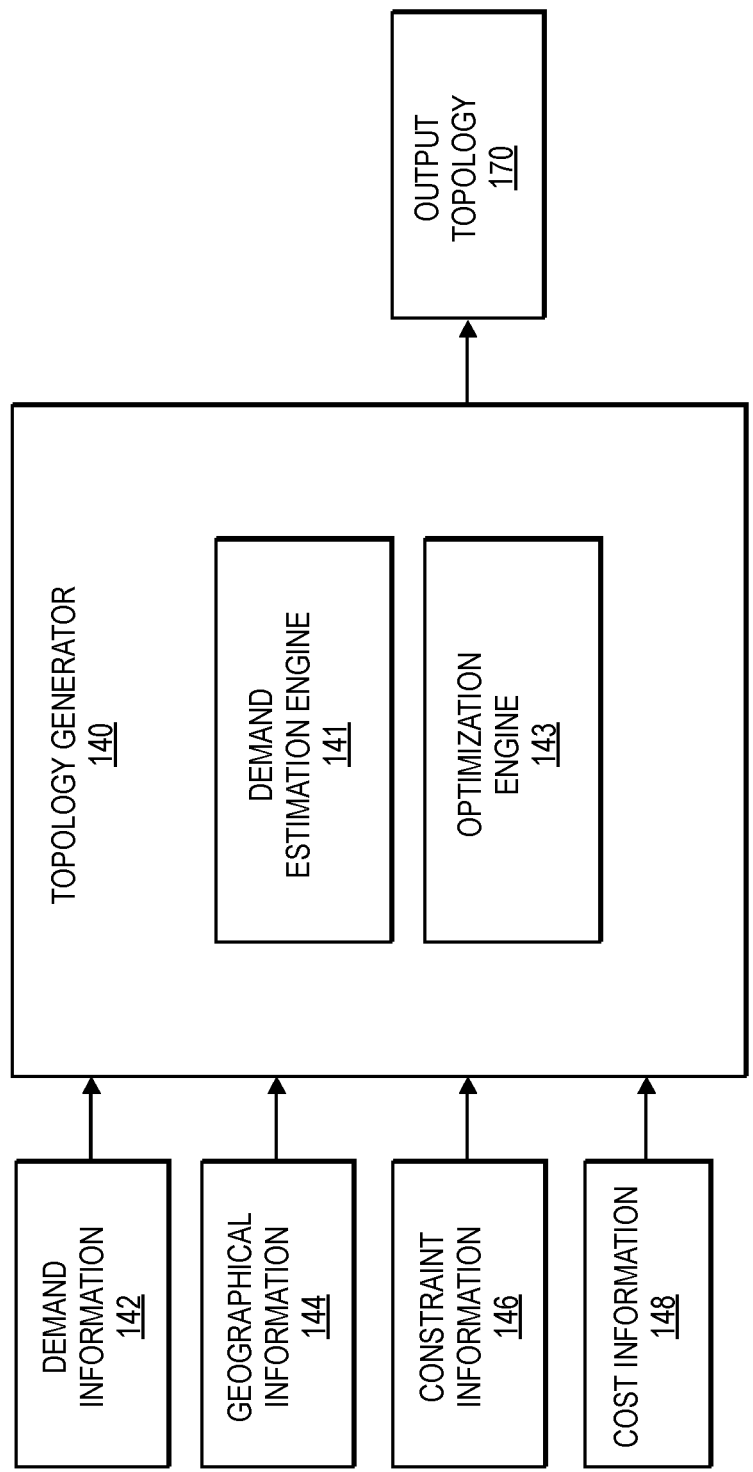
FIG. 1B is a block diagram illustration of an exemplary topology generator, according to exemplary embodiments of the present disclosure.

As set forth in greater detail below, embodiments of the present disclosure can provide automated systems and methods for automatically determining a topology for the efficient allocation and distribution of a service to customers that are distributed over a geographic area. The topology determined by systems and methods provided by embodiments of the present disclosure can facilitate the planning, scheduling, and allocation of resources for the efficient provisioning of services to customers at one or more locations distributed over the geographic area. For example, the determined topology may specify the provisioning of services to customers via various mechanisms at one or more locations. Unlike existing systems and methods, embodiments of the present disclosure can facilitate the efficient planning, scheduling, and allocation of resources in implementations where services are provisioned to a large number of customers, the allocation of resources to provide the services is not easily relocated, and the like. Embodiments of the present disclosure may be utilized, by corporations, governments, and other organizations that may need to provide a service (e.g., healthcare services, employer services, social services, etc.) to a large population (e.g., employees, citizens, residents, members, etc.) that may be distributed over a geographic area (e.g., company facilities and/or offices, state, county, country, etc.).

According to embodiments of the present disclosure, the service may be provisioned to the customers using one or more different mechanisms and/or types of resources. For example, based on the geographic distribution of the customers, the service may be provided at customer sites, at one or more aggregated sites, and/or using third party providers. Alternatively and/or in addition to providing the service at the customer site, the service may also be provided via a mobile and/or "pop-up" type arrangement where in-house customer resources may be dispatched to a site (e.g., on-site at a customer site or a third-party site) to provide services. According to certain aspects, a "hub and spoke" model may be employed, where a primary service provider (e.g., at a customer site) may be considered to be a "hub" provides the service to "spoke" locations. Other mechanisms and/or types of resources (or any combination thereof) may be employed in the provisioning of services depending on the resources available to the service provider. Accordingly, embodiments of the present disclosure can determine a topology to efficiently schedule, allocate, and employ the different mechanisms and/or types of resources to provide the services to a distribution of customers across a geographic area.

According to embodiments of the present disclosure, prior to determination of the topology, a demand estimation model may first be determined. The demand estimation model may include a location-specific demand threshold model, and the locations for provisioning of the service may be determined based on the demand threshold model (e.g., locations with the highest potential to achieve the threshold value, locations with the largest gap between consumption rate compared to the threshold value, etc.). After the locations at which the service may be provided have been determined, the demand estimation model may determine a projected demand at each of the locations. For example, various parameters (e.g., community information, recent trends, location trends, etc.) may be used to determine a demand take rate at each location. Accordingly, estimating the demand at each location can facilitate determination of the mechanism and/or type of resources, as well as the number of resources, to be deployed at each location.

To determine the topology to facilitate efficient scheduling and allocation of the resources to provide the services, certain parameters and/or constraints associated with the provisioning of the service to be provided may be obtained. For example, the number and location of the customers to be serviced, the anticipated demand, characteristics associated with the location of the customers, an expected value of the number of customers at each location that will utilize the service, the type of service each customer is to receive, the type of resources that may be employed to provide the service (e.g., in-house/on-site, mobile/"pop-up", third-party, etc.), any constraints associated with each type of resource (e.g., minimum capacity, maximum capacity, type(s) of service that can be performed, maximum travel distance, etc.), any constraints associated with each customer (e.g., maximum travel distance, type of service required, etc.), any geographical constraints (e.g., legal and/or regulatory restrictions, etc.), costs associated with provisioning of the service to each customer (e.g., base costs, fixed costs, variable costs, cost of unperformed services, etc.), and the like may be obtained. The parameters and/or constraints can be used to define a cost function that may represent a total cost of providing the service while ensuring that none of the constraints are exceeded. After the cost function has been defined, the cost function may be optimized to determine a lowest relative cost for providing the services to the customers using the various mechanisms and/or types of resources. Optimization of the cost function may consider all the various combinations in which the customers may be serviced using the various mechanisms and/or types of resources in view of the constraints to determine a topology providing a lowest relative cost.

Embodiments of the present disclosure can also provide systems and methods that can facilitate customizing a topology for the provisioning of service through the modification and manipulation of various parameters. After the parameters and/or constraints associated with the service to be provided have initially been obtained, one or more of the parameters and/or constraints may be modified to obtain a customized topology for the efficient scheduling, allocation, and provisioning of the services. For example, the parameters and/or constraints may be modified and/or adjusted to limit the topology for the provisioning of services to a certain geographical area (e.g., state, county, country, city, a facility, etc.), limit the topology for the provisioning of services to a certain type of service, to a certain customer type, limit the topology for the provisioning of services to certain mechanisms and/or types of resources, modify one or more of the parameters and/or constraints (e.g., travel distances, capacity controls, etc.) associated with the provisioning of services, and the like. Accordingly, the modified parameters and/or constraints can be used to determine a modified cost function based on the modified parameters and/or constraints, and the modified cost function may also be optimized to determine a lowest relative cost for providing the services to the customers using the various mechanisms and/or types of resources in view of the modified parameters. Similarly, optimization of the modified cost function may consider all the various combinations in which the customers may be serviced using the various mechanisms and/or types of resources in view of the modified parameters to determine a customized topology providing a lowest relative cost in view of the modified parameters.

Additionally, embodiments of the present disclosure can also determine any gaps in coverage that may exist in the generated topology in view of the specified parameters and/or constraints. For example, embodiments of the present disclosure may identify any customers and/or demands that are not assigned to receive service based on the generated topology. Further, embodiments of the present disclosure may identify parameters and/or constraints that may be modified to generate a topology providing full coverage to ensure that each demand is assigned to receive the service.

Embodiments of the present disclosure can also provide user interfaces in connection with the generation and implementation of a topology. For example, a user interface to facilitate the collection, modification, adjustment, etc. of various parameters and/or constraints for the determination and/or customization of a topology can be provided. The user interface can also present an efficient summary of various information associated with the determined topology. Additionally, embodiments of the present disclosure can provide a user interface (e.g., in the form of a portal, etc.) to the customers and/or demand receiving the service being provisioned by the topology such that the customers may access, modify, view, etc. information related to the service being received.

Exemplary embodiments of the present disclosure can employ a combination of demand aggregation model and a constrained delivery in determining the topology. The combination of the models may be able to balance the challenge of delivery to the point of service with the need for very large-scale demand. Exemplary embodiments of the present disclosure can leverage a mathematical model and a candidate generation (e.g., a column generation) process to determine a topology, which balances the combining of demands into a more concentrated location where services can be delivered more efficiently, and the service providers can be moved to the points of (aggregated) demand. Additionally, embodiments of the present disclosure can support the use of in-house or third-party resources to satisfy the demand.

In one exemplary implementation, embodiments of the present disclosure may be utilized to generate a topology for the provisioning of healthcare services (e.g., vaccinations, wellness assessments, information sessions, health screenings, etc.) to the workers of a company who are distributed across many facilities. Further, although embodiments of the present disclosure are described primarily with respect to the provisioning of services by a corporation to its employees, embodiments of the present disclosure may be applicable to the provisioning of any service (e.g., healthcare services, delivery services, information technology services, etc.) by any person, entity, governmental body, etc. to any customers, entities, populations, citizenry, residents, and the like. Further, although embodiments of the present disclosure are described with respect to supporting business-to-business implementations, embodiments of the present disclosure are also applicable to business-to-consumer implementations.

In the exemplary implementation, the demands may be located at fixed locations (e.g., geocodes), and may be composed of one or more types of demand with different cardinalities. Each demand may either be serviced at his/her location, combined with another demand and serviced at that demand's location, or referred to a third-party provider. According to certain aspects, a maximum distance can be specified and associated with each demand, which can limit the distance that the respective demand may be required to travel to be serviced.

The service providers may also have fixed locations and may include one or more demand types that they can satisfy. Other parameters associated with the service providers can also specify a minimum and maximum capacity that each respective service provider can service, a base cost which is assessed whether each respective service provider is assigned a demand or not, a fixed cost which is applicable in the situation that each respective service provider is assigned a demand, a variable cost for each unit of demand each respective service provider is allocated, and an indication whether each respective service provider can service multiple demands. Additionally, a distance parameter may also be provided, which may limit the distance that each respective service provider can be assigned to their primary demand, and how far each respective service provider can travel to service a "spoke" demand. In the hub-and-spoke model, the service provider of a primary demand can be considered to be a hub, and may be assigned to service demands (e.g., aggregated) at the ends of the spoke(s).

Exemplary embodiments of the present disclosure can consider all the possible ways that the various demand types can be satisfied through, for example, a primary service provider, an aggregation of one or more demands, a hub, or a third-party service provider. The resulting allocation of demands to service providers can optimize the total cost while satisfying the service provider capacity constraints and maximum demand travel distances.

In the example implementation, the company may utilize four types of events to provide the healthcare service to its workers and dependent population: (1) on-site events, which may be conducted at sites that meet the certain criteria (e.g., size of the site, capabilities of the site to provide the service, infrastructure of the site, etc.); (2) mobile and/or "pop-up" events, which may be conducted at eligible sites with sufficient space; (3) off-site events, which may take place in community spaces such as parking lots, stadiums, hotels, etc.; and (4) third-party events, which may be allocated to workers who are not able to attend an on-site or off-site option. Both mobile/"pop-up" and off-site events may include a minimum capacity expectation (e.g., a minimum expected number of people to be serviced over a specified duration). The mobile/"pop-up" and off-site events can also be associated with a nearby on-site event to create a hub-and-spoke structure. This can allow, for example, the on-site resources providing the service to operate all of these events.

In determining the topology, the location where each demand will be serviced is determined. Alternatively and/or in addition, specific regions and/or geographic areas may be targeted for provisioning of the service. In the example implementation, the company may have over a million workers spread across more than a thousand facilities. Further, the workers may be categorized based on the organizations to which they belong. Accordingly, the on-site events may be conducted at predefined sites. The workers at each of the site where on-site events are being held may be serviced at their own site. Next, it may be determined: (1) which workers from other sites may be serviced at an on-site event; (2) which sites may host on-site mobile and/or "pop-up" events and which workers should be serviced at the on-site mobile and/or "pop-up" events; (3) where off-site events may be held; and (4) which workers should be serviced by third-party providers. These determinations may be made in view of certain constraints: (1) not all sites with on-site locations may be able to service workers from other sites; (2) workers should not have to travel more than a predefined maximum distance from their work site to a service provider facility (e.g. 10 miles); (3) mobile, "pop-up", and/or offline events may have an associated minimum capacity (e.g., a minimum number of eligible workers) to make the events viable; (4) in view of certain regulatory restrictions, workers from different states may not be serviced at the same locations; and (5) not all workers may want to take advantage of the service—accordingly, an expected value representing a certain percentage of workers who will likely take advantage of the service may be determined. In the example implementation, embodiments of the present disclosure can provide a topology which can assign all the workers to service centers in an optimized manner which may provide a lowest relative overall cost (e.g., considering the base cost for each event and a per unit cost for each assigned worker).

In the example implementation, worker information may be obtained from a centralized data store (e.g., human resources, etc.), and provided to a topology decision support system, which may execute on one or more computing resources. The exemplary system may include an embedded optimization engine that is configured to obtain all the topology parameters, constraints, and/or objectives. In determining the topology, all possible ways of how the workforce for each facility can be serviced using the various on-site, offsite, "pop-up", and/or third-party service providers, while satisfying the constraints and optimizing the overall cost. Aspects of the present disclosure can also identify opportunities where the on-site resource may be used to perform services at other scheduled events in the area. Embodiments of the present disclosure can also employ a scenario-based system that can facilitate obtaining a defined topology for a specific geographic area (e.g., single state, or for the entire country) based on a set of input parameters. According to certain aspects, each topology can be a "published plan" that can be implemented for a particular geographic region and be stored in a data store so that it may be accessed by downstream systems and processes.

Further, although embodiments of the present disclosure are described primarily with respect to the provisioning of services by a corporation to its employees, embodiments of the present disclosure may be applicable to the provisioning of any service by any person, entity, governmental body, etc. to any customers, entities, populations, residents, and the like.

FIG. 1A is an illustration of an exemplary computing environment 100, according to exemplary embodiments of the present disclosure.

As shown in FIG. 1A, environment 100 may include client devices 120-1, 120-2, and/or 120-3, and topology generator 140, which may execute on one or more remote computing resources 130. Client devices 120-1, 120-2, and/or 120-3 may communicate with topology generator 140 via wired and/or wireless connections to network 150. Client devices 120-1, 120-2, and/or 120-3 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 120-1, 120-2, and/or 120-3 and computing resources 130. Further, topology generator 140 may be configured to be in communication with one or more data stores 160 that may be configured to store and maintain certain information, data, parameters, constraints, etc. that may be used by topology generator 140 in the generation of a topology.

According to exemplary embodiments, topology generator 140 may be configured to generate a topology presenting a lowest relative overall cost for efficiently scheduling, allocating, and provisioning a service in view of parameters and/or constraints associated with the provisioning of a service to customers distributed over a geographic area. The topology can specify where and how each demand may receive the service. Further, the generated topology may be communicated, via network 150, from topology generator

140 for presentation on client devices 120-1, 120-2, and/or 120-3. The generated topology may be displayed, for example, as a document, in a table, as a graphical representation (e.g., overlaid on a map depicting the geographical locations of the customers over the geographic area, etc.), and the like. Client devices 120-1, 120-2, and/or 120-3 may access and/or interact with topology generator 140 through network 150 via one or more applications operating and/or executing on client devices 120-1, 120-2, and/or 120-3. For example, a user associated with client devices 120-1, 120-2, and/or 120-3 may execute an application on client devices 120-1, 120-2, and/or 120-3 to access and communicate with topology generator 140 to obtain a topology for providing a service to customers distributed over a geographic area. Additionally, users receiving the service being provided via a topology generated by topology generator 140 may be able to access information associated with the service being provided via client devices 120-1, 120-2, and/or 120-3.

In generating a topology for the provisioning of a service, topology generator 140 may first determine a demand estimation model. According to aspects of the present disclosure, the demand estimation model may include a demand threshold model and a demand model. The demand threshold model may represent an estimation of a proportion of the population at each location that has or is expected to consume the service over time and the demand model may predict the rate of growth of consumption of the service at each location if an event offering the service were to be provided.

For example, the demand threshold model may derive a rate of change based on recent data and/or trends and may forecast to approximate a rate of growth of a proportion of the population that may consume the service. Alternatively and/or in addition, the proportion of the population that is estimated to have consumed the service may be approximated using a sigmoid curve (e.g., an S-curve, etc.). Accordingly, the demand threshold model may be utilized to identify locations at which the service may be provided using the available mechanisms and/or resources. For example, the demand threshold model may forecast the proportion of the demand at each location that has consumed the service as a function of time and can be used to assess the points at which each location is anticipated to achieve a threshold value, and the locations may be identified based on the demand threshold model and the threshold value (e.g., the locations having the highest likelihood to achieve the threshold value may be selected, locations with the largest gap between the demand consumption rate relative to the threshold value may be selected, etc.).

After the locations at which the service may be provided have been determined, the demand model may determine the demand at each of the identified locations if an event offering the service were to be conducted at each respective location. For example, various parameters (e.g., community information, location information, event type, recent trends, location trends, etc.) may be used to determine a demand take rate at each location. The demand model may be formulated, for example, using a regression analysis based on the various parameters. Accordingly, the demand model can facilitate determination of the mechanism and/or type of resources, as well as the number of resources, to be deployed at each location based on the expected take rate of the service. According to embodiments of the present disclosure, the demand estimation model may be determined using one or more trained machine learning models, which is discussed in further detail in connection with FIG. 6.

In addition to the demand estimation model, topology generator 140 may obtain additional parameters and/or constraints associated with the service that is to be provided. The parameters and/or constraints may include the number and locations of the customers to be serviced, an expected value of the number of customers at each location that will utilize the service (e.g., based on the demand estimation model, etc.), the type of service each customer may be provided, the type of resources that may be employed to provide the service (e.g., in-house/on-site, mobile/"pop-up", third-party, etc.), any parameters and/or constraints associated with each type of resource (e.g., minimum capacity, maximum capacity, type(s) of service that can be performed, maximum travel distance, etc.), constraints associated with each customer (e.g., maximum travel distance, type of service required, etc.), geographical constraints (e.g., legal and/or regulatory restrictions, residency restrictions, etc.), costs associated with provisioning of the service to each customer (e.g., base costs, fixed costs, variable costs, cost of unperformed services, etc.), and the like. Accordingly, the parameters and/or constraints may be provided via a user interface presented on client device 120 and may be communicated to topology generator 140 via network 150. Topology generator 140 can use the parameters and/or constraints to define a cost function that may represent a total cost of providing the service while ensuring that none of the constraints are exceeded. Based on the cost function that has been defined, topology generator 140 may optimize the cost function so as to determine a lowest relative cost for providing the services to the customers using the various mechanisms and/or types of resources. Optimization of the cost function may consider all the various combinations and/or permutations in which the customers may be serviced using the various mechanisms and/or types of resources in view of the constraints to determine a topology providing a lowest relative cost. The optimized cost function can define a topology that can facilitate provisioning of the services to the customers based on the provided parameters. The topology can then be provided to client device 120, stored in a data store, and the like. According to certain aspects, the topology may be provided and/or stored as a document, in a table, as a graphical representation (e.g., overlaid on a map depicting the geographical locations of the customers over the geographic area, etc.), and the like.

According to an aspect of the present disclosure, topology generator 140 can also be configured to provide customized topologies based on modifications to one or more of the parameters and/or constraints. For example, a user interface may be presented on client device 120 that may facilitate modification of one or more of the parameters and/or constraints. Accordingly, a user associated with client device 120 may choose to modify one or more of the parameters and/or constraints. For example, the user may elect to limit the provisioning of services to on-site providing of services (e.g., eliminate the option for third-party resources, mobile and/or "pop-up" services, etc.). Alternatively and/or in addition, a user may opt to limit the geography of the services to specific regions (e.g., states, counties, etc.) and/or facilities/locations. According to yet another aspect, a user may elect to change the maximum permissible travel distance, the minimum and/or maximum capacity associated with each service provider, limit the type of customers receiving the service (e.g., based on employee type, health conditions, age, etc.), and the like. The modified parameters and/or constraints may then be provided, via network 150, to topology generator 140.

Based on the modified parameters and/or constraints, topology generator 140 may define a modified cost function that may represent a total cost of providing the service in view of the modified parameters. According to certain aspects, topology generator 140 may retrieve the cost function generated based on the originally provided parameters and/or constraints as a starting point and modify the cost function accordingly in view of the modified parameters and/or constraints to obtain the modified cost function. Alternatively, the modified cost function may be generated by topology generator 140 without relying on the original cost function defined. Consequently, topology generator 140 may optimize the modified cost function so as to determine a lowest relative cost for providing the services to the customers based on the modified parameters and/or constraints. Optimization of the cost function may consider all the various combinations and/or permutations in which the customers may be serviced using the various mechanisms and/or types of resources in view of the modified parameters and/or constraints to determine a customized topology based on the modified parameters and/or constraints that provides a lowest relative cost. The optimized modified cost function can define a customized topology that can facilitate provisioning of the services to the customers based on the modified parameters and/or constraints. The customized topology can then be provided to client devices 120-1, 120-2, and/or 120-3, stored in a data store, and the like. According to certain aspects, the customized topology may be provided and/or stored as a document, in a table, as a graphical representation (e.g., overlaid on a map depicting the geographical locations of the customers over the geographic area, etc.), and the like.

In addition to generating a topology, topology generator 140 can identify any gaps in coverage that may exist in the provisioning of the service specified by the topology. The gap in coverage may be the result of one or more parameters and/or constraints (e.g., maximum travel distance, maximum costs, maximum capacities, etc.), which may have been established such that the generated topology does not provide coverage for all the demands distributed over the geographic area. Accordingly, topology generator 140 may identify these gaps in coverage, and may identify one or more parameters and/or constraints that are creating the gap in coverage and may recommend a modification to the identified parameters and/or constraints to resolve the gap in coverage so that the topology specifies provisioning of the service to provide full coverage for all demands. For example, in an example implementation, the maximum allowable travel distance may have been established at a level (e.g., 10 miles) where all the demands may not be able to reach an event to obtain the service. Accordingly, topology generator 140 may determine that a gap in coverage exists because of the established maximum travel distance and may suggest increasing the maximum allowable travel distance (e.g., to 15 or 20 miles) that resolves the gap in coverage and provides a topology that provisions the service to each demand.

In an exemplary implementation, topology generator 140 may be utilized to generate a topology for the provisioning of healthcare services (e.g., vaccinations, testing, wellness assessments, information sessions, health screenings, information technology (IT) services, etc.) to employees of company who are distributed across many facilities. Accordingly, parameters and/or constraints associated with the employees who are to receive the services may initially be provided to topology generator 140. This may include information, such as, the company's facilities, location of the company's facilities, the number of employees, the types of employees, the locations of the employees (e.g., facility location and/or home location), the type of service each employee may require, an organization within the company to which the employee may belong, and the like. This information may be extracted from the company's human resources department, or other data store which may store and maintain such information. The information initially provided to topology generator 140 may not be limited to those enumerated above, and may include any relevant information, which may be dependent on the organization providing the services, the customers receiving the service, the type of service to be provided, and the like.

The initial parameters and/or constraints provided to topology generator 140 may be used to determine the mechanisms and/or resources (e.g., on-site events, mobile and/or "pop-up" events, and/or third-party events) that may be used to provide the services to the employees. For example, determination of the mechanisms and/or resources to be used to provide the services may be based on the company's facilities, the employees, the available resources, and the like. In this regard, parameters and/or constraints associated with the company's facilities and resources may determine whether each respective facility is capable to host an event and the type of events that it may be able to host. This may include parameters and/or constraints such as number of employees, size of the facility, availability of space to provide the services, availability of transportation to and from the facility, parking at the facility, etc. Accordingly, based on these parameters, topology generator 140 may determine the types of mechanisms and/or resources that may be used to provide the services. In the example implementation, topology generator 140 may determine that the healthcare services may be provided to the employees of the company through on-site healthcare events at the organization's facilities, mobile and/or "pop-up" events (at on-site and/or off-site facilities), and/or third-party providers.

Alternatively and/or in addition, the company providing the service may define the mechanisms and/or resources to be used in providing the service and the defined mechanisms and/or resources may be provided to topology generator 140. For example, the company may determine that it will utilize on-site events, mobile and/or "pop-up" events, and/or third-party events, and provide constraints associated with each of the mechanisms and/or resources to topology generator 140. This may include a minimum capacity that can make the event feasible (e.g., a minimum number of employees to be serviced at each event), a maximum capacity that the event can handle (e.g., a maximum number of employees that may be serviced at each event), and the like.

According to certain aspects, the organization providing the service may define certain mechanisms and/or resources to provide the services and topology generator 140 may also determine certain mechanisms and/or resources as additional mechanisms and/or resources that may be used to supplement and/or be used in conjunction with the mechanisms and/or resources defined by the organization. Additional types of mechanisms and/or resources may be used to provide a service, and may depend on the organization providing the service, the type of service being provided, the customers receiving the service, and the like.

Additional parameters and/or constraints associated with the provisioning of the services may also be provided to topology generator 140. For example, parameters and/or constraints associated with each employee receiving the service (e.g., maximum travel distance, type of service required, etc.), capacity parameters and/or constraints associated with each mechanism and/or resource used to provide the services (e.g., a minimum number of employees to be serviced at each event, a maximum capacity that each event can handle, etc.), geographical constraints (e.g., legal and/or regulatory restrictions, residency restrictions, etc.), costs associated with provisioning of the service (e.g., base costs, fixed costs, variable costs, cost of unperformed services, costs associated with each mechanism and/or resources used to provide the services, costs associated with providing the service to each employee, etc.), an expected value of the percentage of employees that will receive the service, and the like may all be provided to topology generator 140. All the parameters and/or constraints can be used to facilitate determinations of whether an on-site event can provide the service to employees from other sites, where on-site and/or off-site mobile and/or "pop-up" events may be scheduled, where employees should utilize third-party services, and the like.

Accordingly, based on the parameters and/or constraints, topology generator 140 can define a cost function associated with providing the service to the employees of the company. According to exemplary embodiments of the present disclosure, a cost function representing the total overall cost to the company for providing the service may be defined as:

$$\sum_{\forall i \in F} \sum_{\forall k} W^k * U_i^k + \sum_{\forall i \in F'} Z_i * I_i + \sum_{\forall i \in F''} Z_i * J_i + \sum_{\forall i \in 3p} Z_i^{3p} * K_i + \sum_{\forall i \in F} \sum_{\forall i \in F'} \sum_{\forall k} f(i, j, k) * X_{ij}^k + \sum_{\forall i \in F} \sum_{\forall i \in F''} \sum_{\forall k} f''(i, j, k) * W_{ij}^k + \sum_{\forall i \in F} \sum_{\forall j \in 3p} \sum_{\forall k} f^{3p}(i, j, k) * Y_{ij}^k$$

Additionally, certain constraints may be represented as follows. A constraint representing any shortages in assigning an employee to an on-site facility, a mobile and/or "pop-up" facility, and/or a third-party facility may be represented as:

$\sum_{\forall j \in F'} X_{ij}^k + \sum_{\forall j \in F''} W_{ij}^k + \sum_{\forall j \in 3p} Y_{ij}^k + U_i^k = 1$ for every facility $I \in F$ and employee type $k$ Additionally, for each on-site facility, mobile and/or "pop-up" facility, and/or third-party facility that is providing services, an indicator variable constraint may be established as, respectively:

$\sum_{\forall i \in F} \sum_{\forall k} X_{ij}^k - 10000 * I_j \leq 0$ for every onsite facility $j \in F'$ $\sum_{\forall i \in F} \sum_{\forall k} W_{ij}^k - 10000 * J_j \leq 0$ for every onsite facility $j \in F''$ $\sum_{\forall i \in F} \sum_{\forall k} Y_{ij}^k - 10000 * K_j \leq 0$ for every onsite facility $j \in 3p$ Further, for each on-site facility, mobile and/or "pop-up" facility, and/or third-party facility that is providing services, a maximum capacity constraint may be established as, respectively:

$\sum_{\forall i \in F} \sum_{\forall k} r_i * c_i^k * X_{ij}^k \leq M_j$ for every onsite facility $j \in F'$ $\sum_{\forall i \in F} \sum_{\forall k} r_i * c_i^k * W_{ij}^k \leq M_j$ for every onsite facility $j \in F''$ $\sum_{\forall i \in F} \sum_{\forall k} r_i * c_i^k * Y_{ij}^k \leq M_j^{3p}$ for every onsite facility $j \in 3p$ Similarly, for each on-site facility, mobile and/or "pop-up" facility, and/or third-party facility that is providing services, a minimum capacity constraint may be established as, respectively:

$\sum_{\forall i \in F} \sum_{\forall k} r_i * c_i^k * X_{ij} - m_j * I_j \geq 0$ for every onsite facility $j \in F'$ $\sum_{\forall i \in F} \sum_{\forall k} r_i * c_i^k * W_{ij} - m_j * J_j \geq 0$ for every onsite facility $j \in F''$ $\sum_{\forall i \in F} \sum_{\forall k} r_i * c_i^k * Y_{ij} - m_j^{3p} * K_j \geq 0$ for every onsite facility $j \in 3p$ Where:
F can represent the set of all of the company's facilities
F' can represent the set of the company's facilities with on-site capabilities
F" can represent the set of the company's facilities that is eligible to host a mobile and/or "pop-up" event
3p can represent the set of third-party providers
$m_i$ can represent the minimum capacity for facility i
$M_i$ can represent the maximum capacity for facility i
$m_i^{3p}$ can represent the minimum capacity for third-party provider i
$M_i^{3p}$ can represent the maximum capacity for third-party provider i
$c_i^k$ can represent the number of employee type k at facility i
$r_i$ can represent the expected value of employees receiving the service at facility i
$Z_i$ can represent the cost of using facility i for provisioning of the service
$Z_i^{3p}$ can represent the cost of using third-party provider i for provisioning of the service
$W^k$ can represent the cost for not providing the service to a single employee of employee type k
$f(i, j, k)$ can represent the cost of assigning an employee of type k from facility i to obtain the service at on-site facility j
$f''(i, j, k)$ can represent the cost of assigning an employee of type k from facility i to obtain the service at mobile and/or "pop-up" facility j
$f^{3p}(i, j, k)$ can represent the cost of assigning an employee of type k from facility i to obtain the service at third-party provider j $X_{ij}^k \begin{cases} 1, \text{ if employee type } k \text{ in facility } i \text{ will be vaccinated at onsite facility } j \\ 0, \text{ otherwise} \end{cases}$ $W_{ij}^k \begin{cases} 1, \text{ if employee type } k \text{ in facility } i \text{ will be vaccinated at popup facility } j \\ 0, \text{ otherwise} \end{cases}$ $Y_{ij}^k \begin{cases} 1, \text{ if employee type } k \text{ in facility } i \text{ will be vaccinated at 3rd party site } j \\ 0, \text{ otherwise} \end{cases}$ -continued $$U_{ij}^k \begin{cases} 1, \text{ if employee type } k \text{ in facility } i \text{ will not obtain the service} \\ 0, \text{ otherwise} \end{cases}$$

$$I_i \begin{cases} 1, \text{ if facility } i \text{ will be used as an onsite facility} \\ 0, \text{ otherwise} \end{cases}$$

$$J_i \begin{cases} 1, \text{ if facility } i \text{ will be used as a popup facility} \\ 0, \text{ otherwise} \end{cases}$$

$$K_i \begin{cases} 1, \text{ if 3rd party site } i \text{ will be used} \\ 0, \text{ otherwise} \end{cases}$$

$$X_{ij}^k, Y_{ij}^k, W_{ij}^k, U_i^k, J_i, K_i \in Z^{0,1}$$

Based on the above constraints and cost function, topology generator 140 may determine a topology for providing the service to its employees. To determine the topology, the cost function described above may be optimized to determine a lowest relative overall cost to the company to provide the service. The topology may indicate how the service should be provided to the company's employees in view of the described constraints while incurring a lowest relative overall cost. For example, the topology may indicate that the facilities where on-site events and/or mobile and/or "pop-up" event should be held. Further, the topology may also specify where the employees assigned to a facility where an event will not be hosted should seek to obtain the service. This may include an on-site event (e.g., in-house, mobile, "pop-up," etc.) that is within the allowable maximum travel distance and is able to accommodate employees from other facilities, third-party providers, etc. Employees that are assigned to third-party providers may be associated with facilities that are unable to provide an on-site event and are not within the maximum allowable travel distance to a facility that can accommodate employees from other facilities.

Once a topology has been generated and accepted, topology generator 140 may also be configured to facilitate implementation of the topology to provide the services. For example, topology generator 140 can send notifications to recipients of the service (e.g., via client devices 120-1, 120-2, and/or 120-3) and/or provide a portal through which recipients of the service (e.g., the demand) can access information associated with receiving of the service. The notification and/or portal can provide information such as the date, time, location, etc. of the event to which the recipient has been assigned for receiving the service. Additionally, options can be provided if the recipient needs to modify the date, time, location, etc. where he/she is assigned to receive the service and/or if the service is no longer needed (e.g., the user received the service from another source, etc.).

FIG. 1B is a block diagram of an exemplary topology generator 140, according to exemplary embodiments of the present disclosure.

As shown in FIG. 1B, topology generator may include demand estimation engine 141 and optimization engine 143, and may be configured to obtain various information, such as demand information 142, geographical information 144, constraint information 146, cost information 148, and the like. According to embodiments of the present disclosure, topology generator 140 may obtain any information and/or data that may be relevant to the determination and generation of a topology for a service being provided to meet a demand.

Based on the obtained information, topology generator 140 may be configured to generate output topology 170, which may present a lowest relative overall cost for efficiently scheduling, allocating, and provisioning a service in view of parameters and/or constraints associated with the provisioning of a service to customers distributed over a geographic area. According to exemplary embodiments of the present disclosure, output topology 170 generated by topology generator 140 may be utilized for the provisioning of healthcare services (e.g., vaccinations, wellness assessments, information sessions, health screenings, information technology (IT) services, etc.) to employees of company who are distributed across many facilities. Accordingly, parameters and/or constraints associated with the employees who are to receive the services may initially be provided to topology generator 140.

According to aspects of the present disclosure, demand information 142, geographical information 144, constraint information 146, and cost information 148 may include information relevant to the service to be provided. This may include information such as the company's facilities, location of the company's facilities, the number of employees, the types of employees, the locations of the employees (e.g., facility location and/or home location), the type of service each employee may require, an organization within the company to which the employee may belong, geographical information, trends and patterns associated with the service to be provided, regulation associated with the service to be provided, consumer sentiment associated with the service to be provided, cost information associated with provisioning of the service, and the like. This information may be extracted from one or more data stores, which may store and maintain such information. The information initially provided to topology generator 140 may not be limited to those enumerated above, and may include any relevant information, which may be dependent on the organization providing the services, the customers receiving the service, the type of service to be provided, and the like.

Based on the information provided to topology generator 140, demand estimation engine 141 may determine a demand estimation model to facilitate determination of a predicted demand that will consume the service. The demand estimation model may include a demand threshold model and a demand model and may facilitate determination of locations at which the services will be provided, the mechanisms and/or the number of resources that may be deployed at each location to provision the services, and the like. According to embodiments of the present disclosure, the demand threshold model may represent an estimation of a proportion of the population at each location that has or is expected to consume the service over time and the demand model may predict the rate of growth of consumption of the service at each location if an event offering the service were to be provided.

For example, the demand threshold model may derive a rate of change based on recent data and/or trends and may forecast to approximate a rate of growth of a proportion of the population that may consume the service. Alternatively and/or in addition, the proportion of the population that is estimated may have consumed the service be approximated using a sigmoid curve (e.g., an S-curve, etc.). Accordingly, the demand threshold model may be utilized to identify locations at which the service may be provided using the available mechanisms and/or resources. For example, the demand threshold model may forecast the proportion of the demand at each location that has consumed the service as a function of time and can be used to assess the points at which each location is anticipated to achieve a threshold value, and the locations may be identified based on the demand threshold model and the threshold value (e.g., the locations having the highest likelihood to achieve the threshold value may be selected, locations with the largest gap between the demand consumption rate relative to the threshold value may be selected, etc.).

After the locations at which the service may be provided have been determined, the demand model may determine the demand at each of the identified locations if an event offering the service were to be conducted at each respective location. For example, various parameters (e.g., community information, location information, event type, recent trends, location trends, etc.) may be used to determine a demand take rate at each location. The demand model may be formulated, for example, using a regression analysis based on the various parameters. Accordingly, the demand model can facilitate determination of the mechanism and/or type of resources, as well as the number of resources, to be deployed at each location based on the expected take rate of the service.

In addition to the demand estimation model, topology generator 140 may obtain additional parameters and/or constraints associated with the service that is to be provided. The parameters and/or constraints may include the number and locations of the customers to be serviced, an expected value of the number of customers at each location that will utilize the service (e.g., based on the demand estimation model, etc.), the type of service each customer may be provided, the type of resources that may be employed to provide the service (e.g., in-house/on-site, mobile/"pop-up", third-party, etc.), any parameters and/or constraints associated with each type of resource (e.g., minimum capacity, maximum capacity, type(s) of service that can be performed, maximum travel distance, etc.), constraints associated with each customer (e.g., maximum travel distance, type of service required, etc.), geographical constraints (e.g., legal and/or regulatory restrictions, residency restrictions, etc.), costs associated with provisioning of the service to each customer (e.g., base costs, fixed costs, variable costs, cost of unperformed services, etc.), and the like. Topology generator 140 can use the parameters and/or constraints to define a cost function that may represent a total cost of providing the service while ensuring that none of the constraints are exceeded. Based on the cost function that has been defined, optimization engine 143 may optimize the cost function so as to determine a lowest relative cost for providing the services to the customers using the various mechanisms and/or types of resources. Optimization of the cost function may consider all the various combinations and/or permutations in which the customers may be serviced using the various mechanisms and/or types of resources in view of the constraints to determine output topology 170, which may provide a lowest relative cost. According to aspects of the present disclosure, optimization engine 143 may apply any relevant optimization algorithms, methods, heuristics, and the like (e.g., quantum optimization algorithms, combinatorial algorithms, iterative methods, gradient descent methods, convergence models, etc.). The optimized cost function can define output topology 170, which can facilitate provisioning of the services to the customers based on the provided parameters. Output topology 170 can specify where the services are to be provided to each demand (e.g., location, facility, etc.), the event/mechanism that will be hosted at each location (e.g., on-site, third party, hub and spoke, mobile, "pop-up", etc.), an assignment where each demand is to receive the services (e.g., location, date and time, etc.), and the like. Output topology 170 can then be provided to a client device (e.g., client devices 120-1, 120-2, and/or 120-3, etc.), stored in a data store, and the like. According to certain aspects, the topology may be provided and/or stored as a document, in a table, as a graphical representation (e.g., overlaid on a map depicting the geographical locations of the customers over the geographic area, etc.), and the like.

According to an aspect of the present disclosure, topology generator 140 can also be configured to provide customized topologies based on modifications to one or more of the parameters and/or constraints. For example, any of the data, information, parameters, constraints, etc. (e.g., demand information 142, geographical information 144, constraint information 146, cost information 148) provided to topology generator 140 may include adjusted and/or modified values. Based on the adjusted and/or modified values, demand estimation engine 141 may determine a modified demand estimation model, and topology generator 140 may define a modified cost function that may represent a total cost of providing the service in view of the modified values. According to certain aspects, topology generator 140 may retrieve the cost function generated based on the originally provided parameters and/or constraints as a starting point and modify the cost function accordingly in view of the modified parameters and/or constraints to obtain the modified cost function. Alternatively, the modified cost function may be generated by topology generator 140 without relying on the original cost function defined. Consequently, optimization engine 143 may optimize the modified cost function so as to determine a lowest relative cost for providing the services to the customers based on the modified parameters and/or constraints. Optimization of the cost function may consider all the various combinations and/or permutations in which the customers may be serviced using the various mechanisms and/or types of resources in view of the modified parameters and/or constraints to determine a customized topology based on the modified parameters and/or constraints that provides a lowest relative cost. Accordingly, as shown in FIG. 1B, output topology 170 may include a customized topology that can facilitate provisioning of the services to the customers based on the modified parameters and/or constraints. Output topology 170 can then be provided to a client device (e.g., client device 120, etc.), stored in a data store, and the like. According to certain aspects, the topology may be provided and/or stored as a document, in a table, as a graphical representation (e.g., overlaid on a map depicting the geographical locations of the customers over the geographic area, etc.), and the like.

In addition to generating a topology, topology generator 140 can identify any gaps in coverage that may exist in the provisioning of the service specified by the topology. The gap in coverage may be the result of one or more parameters and/or constraints (e.g., maximum travel distance, maximum costs, maximum capacities, etc.), which may have been established such that the generated topology does not provide coverage for all the demands distributed over the geographic area. The gap in coverage may be presented to the user concurrent with a presentation of the generated topology to draw attention to the incomplete coverage.

Accordingly, topology generator 140 may identify these gaps in coverage, and may identify one or more parameters and/or constraints that are creating the gap in coverage and may recommend a modification to the identified parameters and/or constraints to resolve the gap in coverage so that the topology specifies provisioning of the service to provide full coverage for all demands. For example, in an example implementation, the maximum allowable travel distance and/or a maximum capacity of one or more events may have been established at a level (e.g., 10 miles and maximum capacity of 500) where all the demands may not be able to reach an event to obtain the service within the travel distance and at a facility such that it does not exceed the maximum capacity. Accordingly, topology generator 140 may determine that a gap in coverage exists because of the established maximum travel distance and/or the maximum capacity of a facility and may suggest increasing the maximum allowable travel distance (e.g., to 15 or 20 miles) and/or increasing the maximum capacity of one or more locations that resolves the gap in coverage and provides a topology that provisions the service to each demand.

Figure 2:
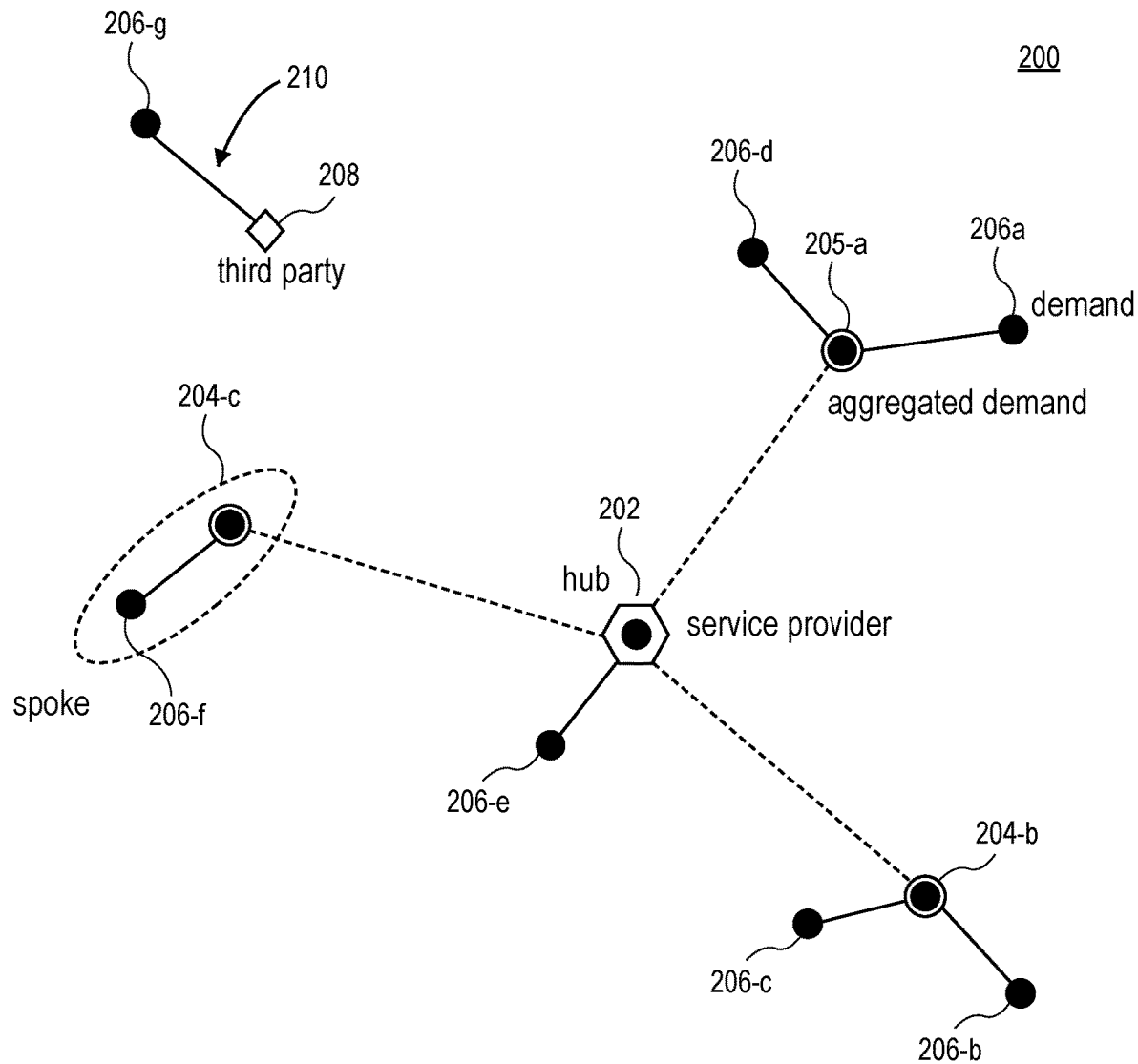
FIG. 2 is an illustration of an exemplary topology, according to exemplary embodiments of the present disclosure.

FIG. 2 is an illustration of an exemplary topology 200, according to exemplary embodiments of the present disclosure. According to embodiments of the present disclosure, topology 200 may be a topology (e.g., output topology 170) generated by topology generator 140.

As shown in FIG. 2, topology 200 may define how services are to be provisioned to demands distributed over a geographic area. Topology 200 may include hub 202, and may define provisioning of services to aggregated demands 204-a, 204-b, and 204-c, and demands 206-a, 206-b, 206-c, 206-d, 206-e, 206-f, and 206-g. As illustrated, hub 202 may service demand 206-e and aggregated demands 204-a, 204-b, and 204-c, and each of demands 206-a, 206-b, 206-c, 206-d, and 206-f may be serviced via a "spoke" from one of aggregated demands 204-a, 204-b, and 204-c. For example, after the service has been provided at aggregated demands 204-a, 204-b, and 204-c, the service providers may travel to demands 206-a, 206-b, 206-c, 206-d, and 206-f to service each of the spoke demands.

According to aspects of the present disclosure, hub 202, and aggregate demands 204-a, 204-b, and 204-c may include an in-house/on-site provisioning of services, a mobile/"pop-up" provisioning of services, and the like. Further, demand 206-g may be serviced by third party 208. For example, it may have been determined that demand 206-g is to be serviced by third party 208 based on geographic constraints/parameters (e.g., a distance may be too great to be efficiently serviced by hub 202 or aggregated demands 204-a, 204-b, and 204-c, etc.), capacity constraints (e.g., none of hub 202 or aggregated demands 204-a, 204-b, and 204-c, may have had the capacity to service additional demand, etc.), and the like.

Topology 200 may be generated, for example, by topology generator 140 and may represent a topology presenting a lowest relative cost for provisioning of services to demand distributed over the geographic area shown in FIG. 2. For example, topology 200 may have been determined based on various information, data, parameters, and/or constraints associated with the service and the demand associated with the service to be provided. First, a demand estimation model may have been determined to facilitate determination of the locations at which the services will be provided and to approximate the expected demand at each location. The demand estimation model may include a location-specific demand threshold model, and a model projecting a demand take rate at each location.

Next, the various, data, information, parameters and/or constraints can be used to define a cost function that may represent a total cost of providing the service while ensuring that none of the constraints are exceeded. After the cost function has been defined, the cost function may be optimized to determine a lowest relative cost for providing the services to the customers using the various mechanisms and/or types of resources. Optimization of the cost function may consider all the various combinations in which the customers may be serviced using the various mechanisms and/or types of resources in view of the constraints to determine a topology providing a lowest relative cost. Accordingly, topology 200 may represent an optimization of the cost function based on the various data, information, parameters, and constraints associated with the provisioning of services shown in FIG. 2.

FIGS. 3A-3D are illustrations of environments 300, 320, 340 and 350, according to exemplary embodiments of the present disclosure. According to embodiments of the present disclosure, environments 300, 320, 340, and 350 may represent geographic areas for which topologies may be generated in accordance with embodiments of the present disclosure so as to provide services to demands distributed over environments 300, 320, 340, and 350.

Figure 3A:
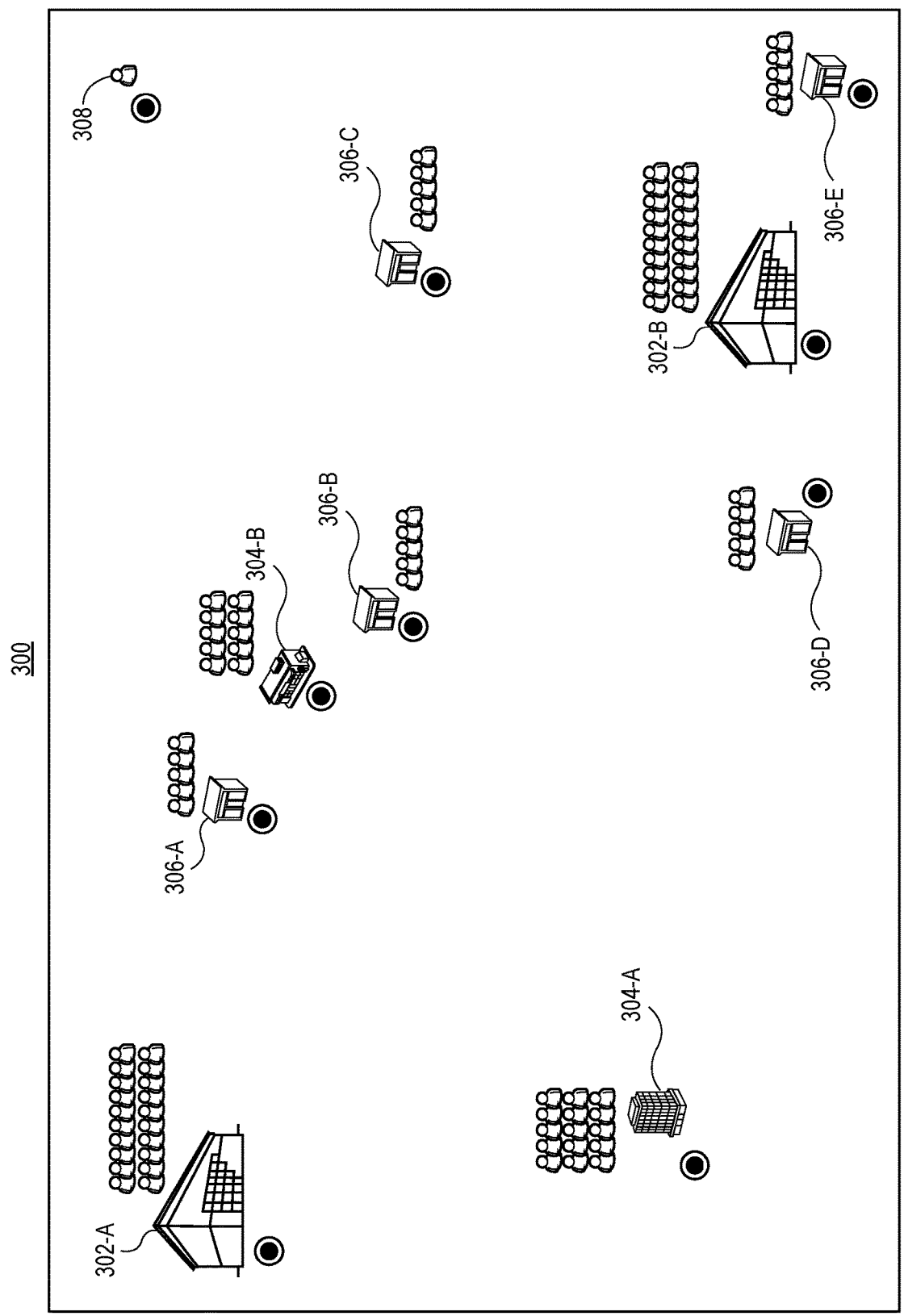
FIGS. 3A-3D are illustrations of exemplary environments, according to exemplary embodiments of the present disclosure.

FIG. 3A illustrates demands 302, 304, 306, and 308 distributed throughout geographic area 300. In an example implementation, demands 302, 304, 306, and 308 may represent employees of an organizations to whom the organization may be providing a service, such as a vaccination. Accordingly, the location of demands may represent the organization's various facilities, locations, etc. Alternatively and/or in addition, demands 302, 304, 306, and 308 can represent any consumer, customer, demand, etc. to whom a service is being provided. As shown in FIG. 3A, demands 302-A and 302-B may represent large facilities, demands 304-A and 304-B may represent medium-sized facilities, demands 306-A, 306-B, 306-C, 306-D, and 306-E may represent small facilities, and demand 308 may represent a remote demand who is not necessarily affiliated with a specific facility.

According to embodiments of the present disclosure, in the provisioning of services to demands 302, 304, 306, and 308, it may be desirable to determine a topology presenting a lowest relative cost for providing the services to demands 302, 304, 306, and 308. In determining the topology, a demand estimation forecast may first be determined. As described herein, the demand estimation model may include a demand threshold model. For example, in the example implementation where an organization is provisioning services to demands 302, 304, 306, and 308, the organization may have a threshold value as a proportion of its employee population that the organization is targeting to consume the service. For example, in the example implementation of the provisioning of a vaccine, the organization may have a target of vaccinating 70% of its workforce. Accordingly, the demand threshold model may forecast the proportion of the demand at each location that has consumed the service as a function of time. In the example implementation of an organization vaccinating its workforce, the demand threshold model may facilitate forecasting a point in time at which the threshold value of 70% may be achieved at each location.

According to certain aspects, the forecast may be based on a rate of change based on recent data and/or trends to approximate a rate of growth and/or a sigmoid curve (e.g., an S-curve, etc.) to estimate the rate of growth. The forecasted rates of growth can be used to assess the points at which each location is anticipated to achieve the threshold value. Accordingly, the demand threshold model may be utilized to identify locations at which the service may be provided using the available mechanisms and/or resources. For example, a threshold value for the total proportion of the population that has consumed the service may be determined for each potential location, and the locations may be identified based on the demand threshold model and the threshold value (e.g., the locations having the highest likelihood to achieve the threshold value may be selected, locations with the largest gap between the demand consumption rate relative to the threshold value may be selected, etc.).

After selection of locations at which the service may be provided, the demand estimation model may also include a demand model for each location to forecast the anticipated demand at each location. For example, data and information associated with each location may be processed to determine a forecasted demand for each location. In the example implementation of an organization providing vaccinations to its employees, information such as vaccination levels (e.g., at the facility, in the community, etc.), trends in the vaccination rates (e.g., at the facility, in the community, etc.), recent news (e.g., regulatory approvals, etc.), and the like may be used to determine the expected demand at each location. According to embodiments of the present disclosure, the demand model may be formulated, for example, using a regression analysis based on the data and information associated with each location. Accordingly, the demand model can facilitate determination of the mechanism and/or type of resources, as well as the number of resources, to be deployed at each location based on the expected take rate of the service.

In addition to the demand estimation, other parameters, constraints, and/or information may be associated with each of demands 302, 304, 306, and 308. For example, there may be parameters and/or constraints associated with the employees at demands 302, 304, 306, and 308 receiving the service (e.g., maximum travel distance, type of service required, etc.), capacity parameters and/or constraints associated with each mechanism and/or resource used to provide the services (e.g., a minimum number of employees to be serviced at each event, a maximum capacity that each event can handle, etc.), geographical constraints (e.g., legal and/or regulatory restrictions, residency restrictions, etc.), costs associated with provisioning of the service (e.g., base costs, fixed costs, variable costs, cost of unperformed services, costs associated with each mechanism and/or resources used to provide the services, costs associated with providing the service to each employee, etc.), an expected value of the percentage of employees that will receive the service, and the like. All the parameters and/or constraints can be used to facilitate determination of a topology for providing services to demands 302, 304, 306, and 308. For example, the various, data, information, parameters and/or constraints can be used to define a cost function that may represent a total cost of providing the service to demands 302, 304, 306, and 308 while ensuring that none of the constraints are exceeded. After the cost function has been defined, the cost function may be optimized to determine a lowest relative cost for providing the services to the customers using the various mechanisms and/or types of resources. Optimization of the cost function may consider all the various combinations in which the customers may be serviced using the various mechanisms and/or types of resources in view of the constraints to determine a topology providing a lowest relative cost.

Figure 3B:
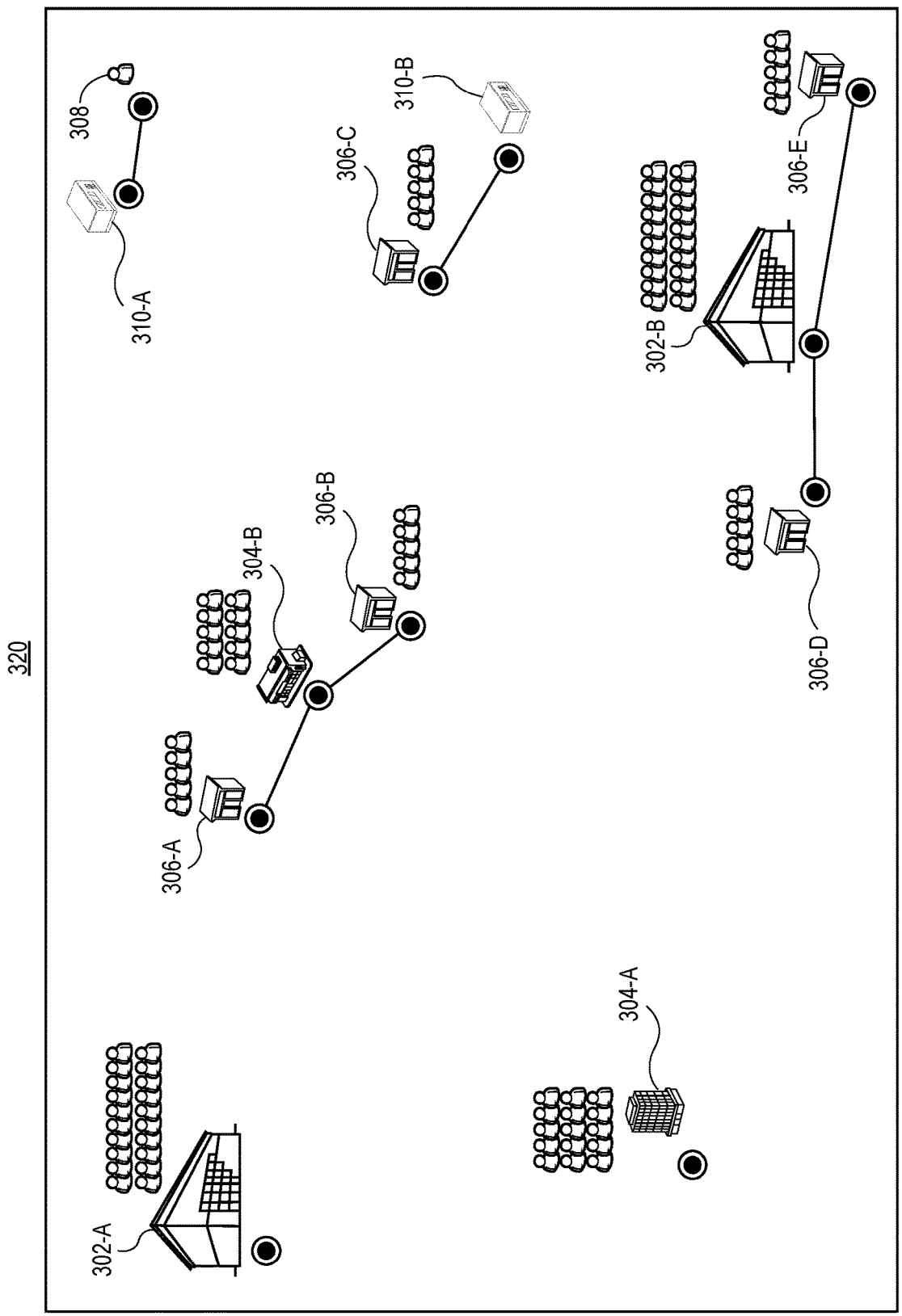

FIG. 3B illustrates an exemplary environment 320 with an exemplary topology defining how services may be provided to demands 302, 304, 306, and 308. The topology illustrated in FIG. 3B may have been determined based on an optimization of a cost function defined by the data, information, parameters, and/or constraints associated with the demands distributed throughout environment 300 and may represent a total cost of providing the service to the demands distributed throughout environment 300. According to aspects of the present disclosure, the cost function may be optimized using any relevant optimization algorithms, methods, heuristics, and the like (e.g., quantum optimization algorithms, combinatorial algorithms, iterative methods, gradient descent methods, convergence models, etc.).

As shown in FIG. 3B, demands 302-A (e.g., a large facility) and 304-A (e.g., a medium-sized facility) may host events (e.g., on-site, pop-up, etc.) to provide the service to employees affiliated with demands 302-A and 304-A, respectively. However, the events hosted at demands 302-A and 304-A may not be prescribed to provide the service to employees affiliated with another facility. For example, the facility may be located such that it would exceed a travel limitation constraint such that employees from another facility would not be able to attend, the maximum capacity of the events hosted at demands 302-A and 304-A may not be sufficient to accommodate employees affiliated with another facility, and the like.

The topology illustrated in FIG. 3B may specify that events are also to be hosted at demands 302-B and 304-B. Further, the event hosted at demand 302-B may also serve employees associated with demands 306-D and 306-E, and the event hosted at demand 304-B may also serve employees associated with demands 306-A and 306-B. Alternatively and/or in addition, demand 302-B and demands 306-D and 306-E may be set up as a hub and spoke model, where service providers may travel to service demands 306-D and 306-E after providing the service at demand 302-B. Similarly demand 304-B and demands 306-A and 306-B may be set up as a hub and spoke model, where service providers may travel to service demands 306-A and 306-B after providing the service at demand 304-B. Further, the illustrated topology may specify that demand 308 may be served by third-party provider 310-A and demand 306-C may be served by third-party provider 310-B.

Figure 3C:
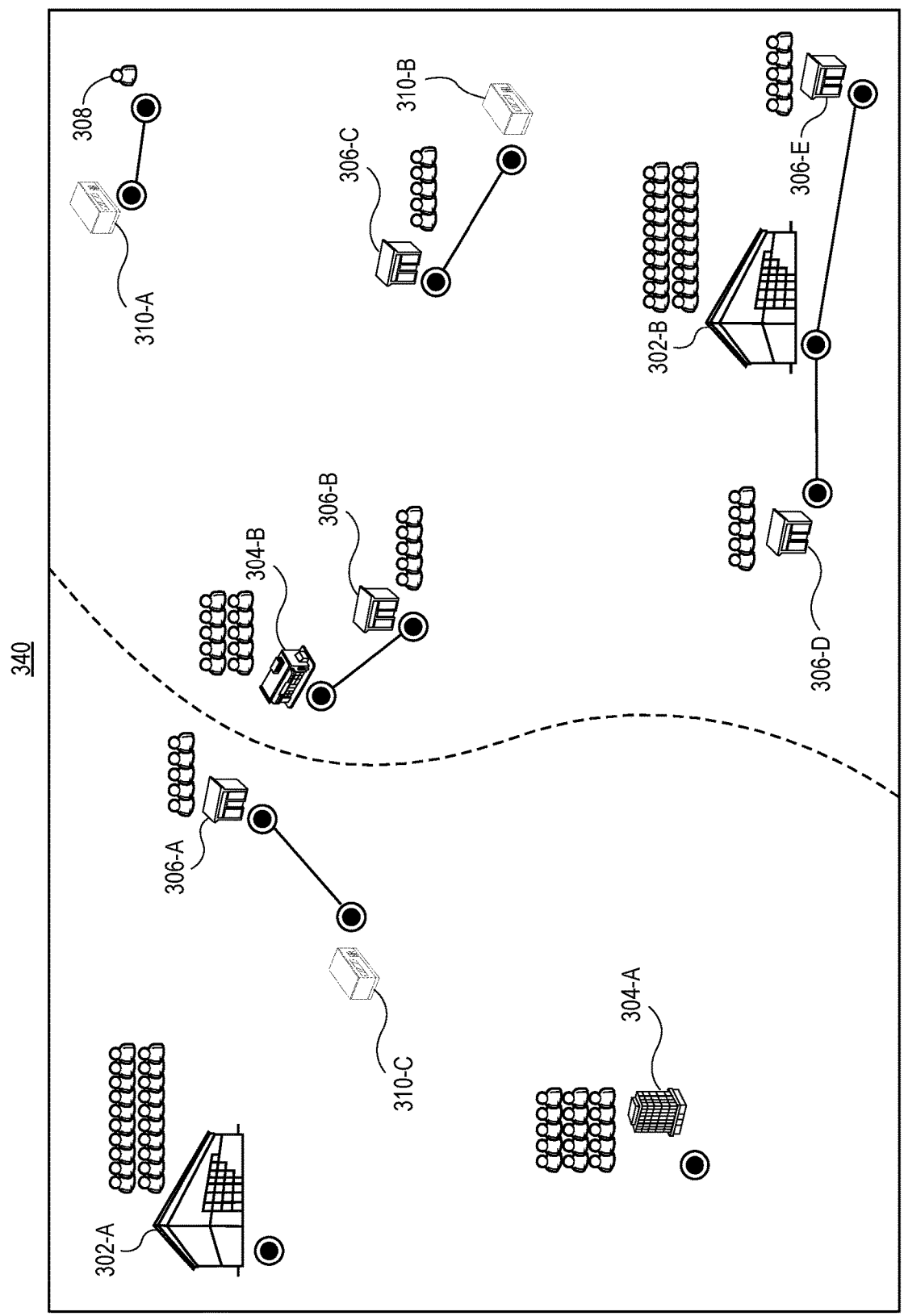

FIG. 3C illustrates an exemplary environment 340 with another exemplary topology defining how services may be provided to demands 302, 304, 306, and 308. Environment 340 shown in FIG. 3C is substantially similar to environment 320 shown in FIG. 3B, however, environment 340 includes border 342 separating demand 306-A from demand 304-B. For example, border 342 may represent a city/town/village border, a county border, a state border, a country border, or the like. Further, there may be circumstances where cross border servicing of demands may not be possible. Continuing the example implementation of an organization providing vaccinations to its employees, in situations where vaccinations have been provided and/or allocated by a specific locality or municipality (e.g., city, town, county, state, etc.), regulations may exist that prohibit the vaccination being used on residents of other localities or municipalities. Accordingly, the exemplary topology shown in FIG. 3C may differ from the topology shown in FIG. 3B in that demand 306-A may be served by third-party provider 310-C (rather than via an event hosted by at demand 304-B) in view of border 342.

Figure 3D:
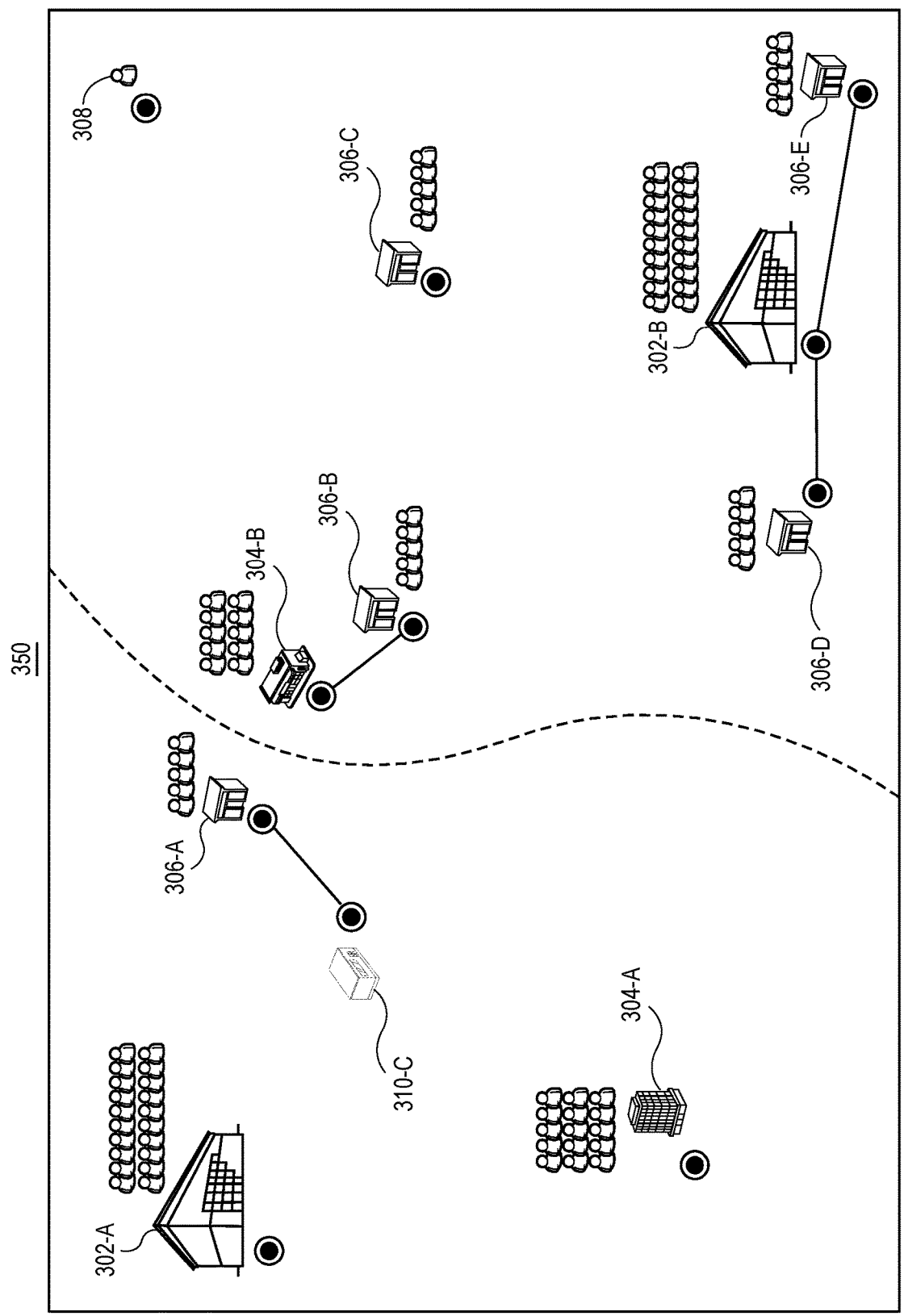

FIG. 3D illustrates an exemplary environment 350 with another exemplary topology defining how services may be provided to demands 302, 304, 306, and 308. Environment 350 shown in FIG. 3C is substantially similar to environment 340 shown in FIG. 3C, however, environment 350 shows that demand 306-C and 308 may not be assigned to receive the service being provided. Accordingly, embodiments of the present disclosure may identify the gap in coverage (e.g., demands 306-C and 308) in the provisioning of services in environment 350 shown in FIG. 3D. Additionally, embodiments of the present disclosure may determine that the gap in coverage is a result of not allowing for third-party providers to be included in generation of the topology. Accordingly, embodiments of the present disclosure may suggest allowing third-party providers to be included in generation of the topology such that the gap in coverage (e.g., demands 306-C and 308) may obtain the service via third party provided (e.g., as illustrated in the topology shown in FIG. 3C).

Figure 4A:
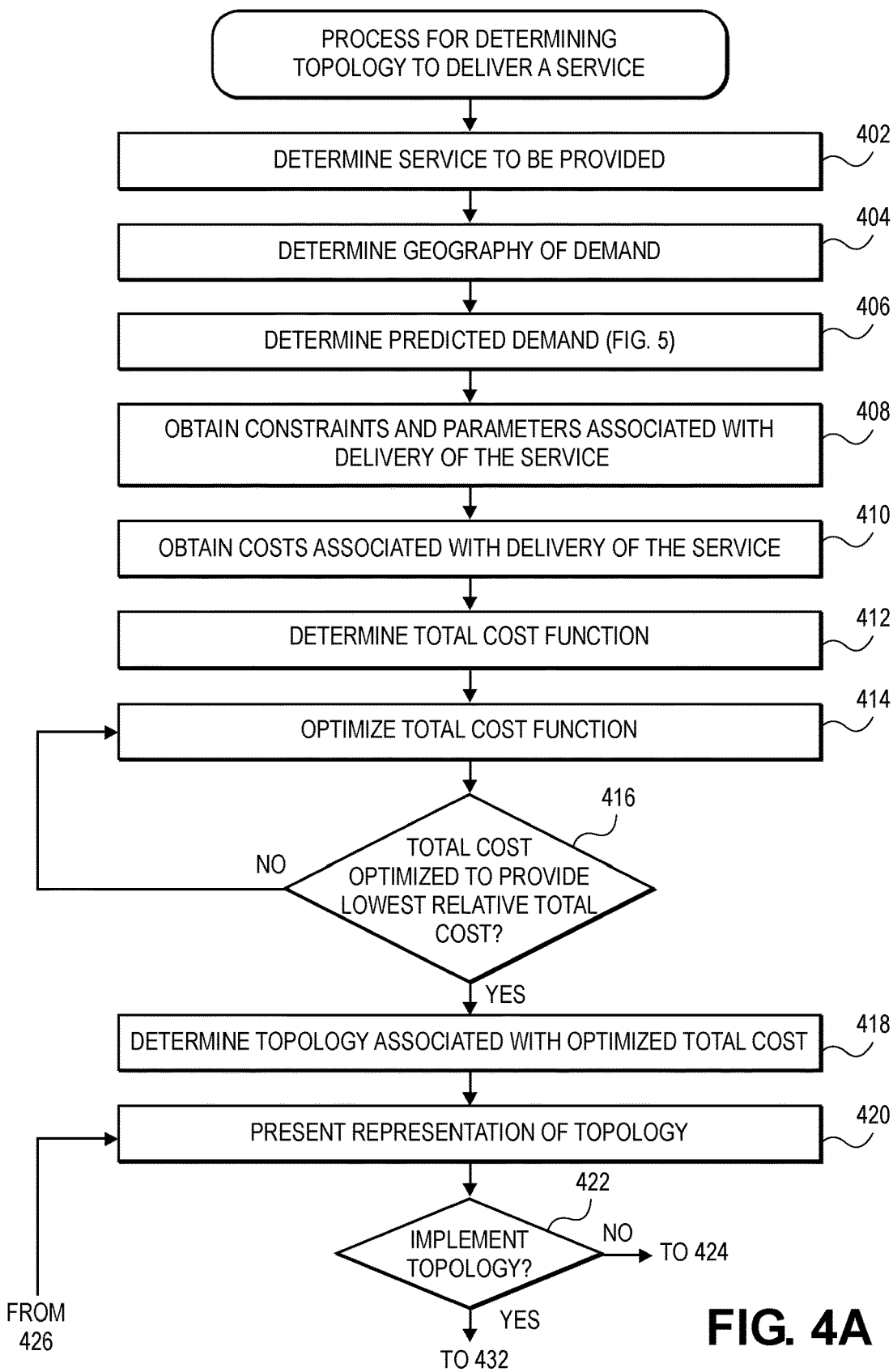
FIGS. 4A and 4B is a flow diagram of an exemplary topology determination process, according to exemplary embodiments of the present disclosure.
Figure 4B:
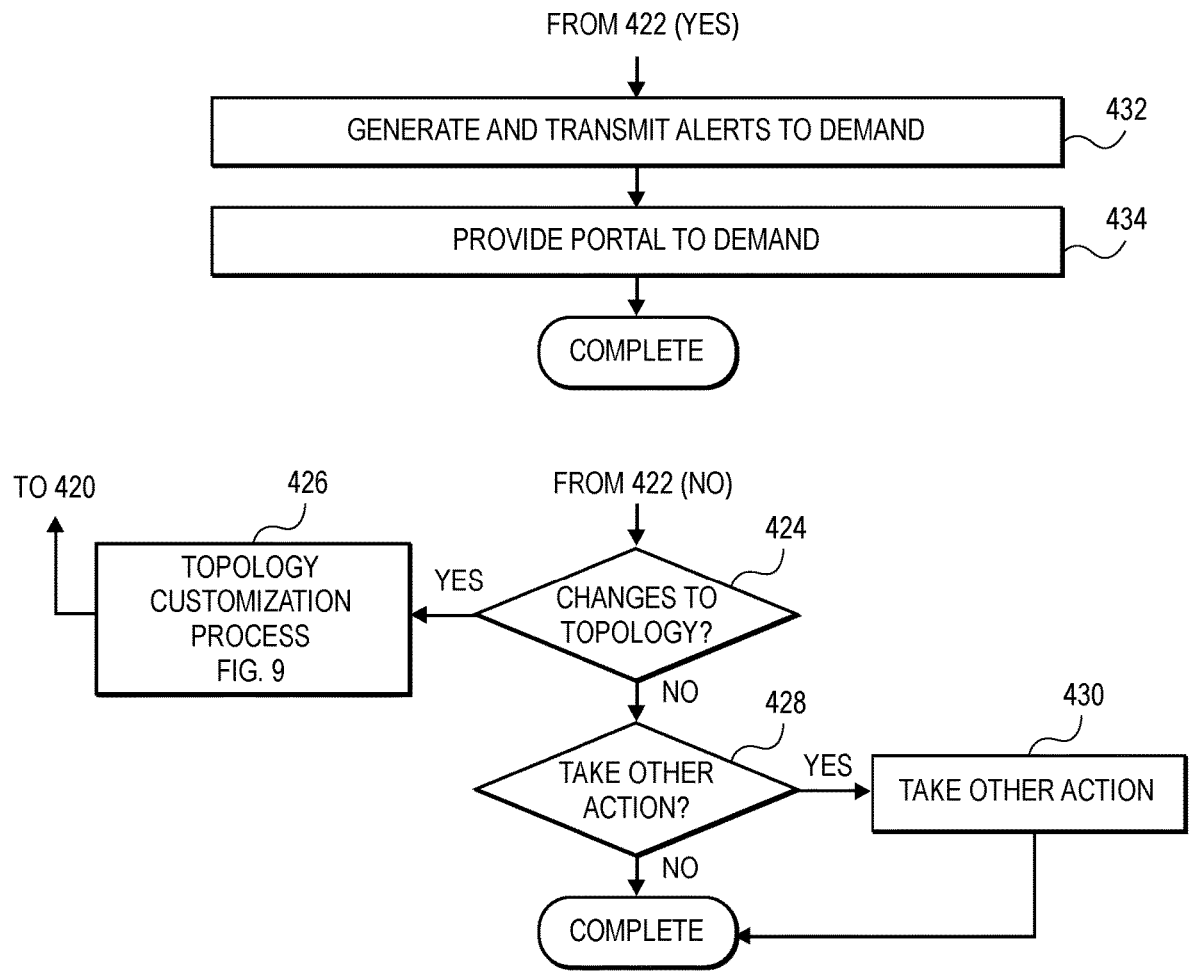

FIGS. 4A and 4B is a flow diagram of an exemplary process 400 for determining a topology for delivering a service, according to exemplary embodiments of the present disclosure. For example, process 400 may be performed by topology generator 140 in generating a topology presenting a lowest relative cost for providing a service to a demand that may be distributed over a geographic area.

As shown in FIGS. 4A and 4B, process 400 may begin with determining the service to be provided to the demand, as in step 402. For example, embodiments of the present disclosure may be utilized to plan and schedule the provisioning of any service (e.g., healthcare services—vaccinations, wellness assessments, health screenings, informational sessions, etc.—delivery services, information technology services, etc.) by any person, entity, organization, governmental body, etc. to any customers, entities, populations, citizenry, residents, and the like.

In step 404, the geography of the demand may be determined. This may include, for example, obtaining information in connection with the locations of the demand, the density of the demands at the various locations, the distances between the locations, characteristics of the demand at the various locations, trends and characteristics of the community surrounding the various locations, and the like. Based on this information, a predicted demand may be determined, as in step 406. Determining the predicted demand may include determination of a demand estimation model and is described in further detail herein in connection with FIG. 5.

In addition to the determined predicted demand, other parameters and constraints associated with the provisioning of services may also be obtained, as in steps 408 and 410. The parameters and/or constraints may include the number and locations of the customers to be serviced, an expected value of the number of customers at each location that will utilize the service (e.g., based on the demand estimation model, etc.), the type of service each customer may be provided, the type of resources that may be employed to provide the service (e.g., in-house/on-site, mobile/"pop-up", third-party, etc.), any parameters and/or constraints associated with each type of resource (e.g., minimum capacity, maximum capacity, type(s) of service that can be performed, maximum travel distance, etc.), constraints associated with each customer (e.g., maximum travel distance, type of service required, etc.), geographical constraints (e.g., legal and/or regulatory restrictions, residency restrictions, etc.), costs associated with provisioning of the service to each customer (e.g., base costs, fixed costs, variable costs, cost of unperformed services, etc.), and the like. Topology generator 140 can use the parameters and/or constraints to define a cost function that may represent a total cost of providing the service while ensuring that none of the constraints are exceeded.

In step 412, a total cost for providing the service may be determined. This may be defined, for example, as a cost function based on the parameters and constraints obtained in steps 408 and 410. According to exemplary embodiments of the present disclosure, a cost function representing the total overall cost to the company for providing the service may be defined as:

$$\sum_{\forall i \in F} \sum_{\forall k} W^k * U_i^k + \sum_{\forall i \in F'} Z_i * I_i + \sum_{\forall i \in F''} Z_i * J_i +$$
$$\sum_{\forall i \in 3p} Z_i^{3p} * K_i + \sum_{\forall i \in F} \sum_{\forall i \in F'} \sum_{\forall k} f(i, j, k) * X_{ij}^k +$$
$$\sum_{\forall i \in F} \sum_{\forall i \in F''} \sum_{\forall k} f''(i, j, k) * W_{ij}^k + \sum_{\forall i \in F} \sum_{\forall j \in 3p} \sum_{\forall k} f^{3p}(i, j, k) * Y_{ij}^k$$

Where:
- F can represent the set of all of the company's facilities
- F' can represent the set of the company's facilities with on-site capabilities
- F" can represent the set of the company's facilities that is eligible to host a mobile and/or "pop-up" event
- 3p can represent the set of third-party providers
- $m_i$ can represent the minimum capacity for facility i
- $M_i$ can represent the maximum capacity for facility i
- $m_i^{3p}$ can represent the minimum capacity for third-party provider i
- $M_i^{3p}$ can represent the maximum capacity for third-party provider i
- $c_i^k$ can represent the number of employee type k at facility i
- $r_i$ can represent the expected value of employees receiving the service at facility i
- $Z_i$ can represent the cost of using facility i for provisioning of the service
- $Z_i^{3p}$ can represent the cost of using third-party provider i for provisioning of the service
- $W^k$ can represent the cost for not providing the service to a single employee of employee type k
- f(i, j, k) can represent the cost of assigning an employee of type k from facility i to obtain the service at on-site facility j
- f"(i, j, k) can represent the cost of assigning an employee of type k from facility i to obtain the service at mobile and/or "pop-up" facility j
- $f^{3p}$(i, j, k) can represent the cost of assigning an employee of type k from facility i to obtain the service at third-party provider j $$X_{ij}^k \begin{cases} 1, & \text{if employee type } k \text{ in facility } i \text{ will be vaccinated at onsite facility } j \\ 0, & \text{otherwise} \end{cases}$$

-continued $$W_{ij}^k \begin{cases} 1, & \text{if employee type } k \text{ in facility } i \text{ will be vaccinated at popup facility } j \\ 0, & \text{otherwise} \end{cases}$$

$$Y_{ij}^k \begin{cases} 1, & \text{if employee type } k \text{ in facility } i \text{ will be vaccinated at 3rd party site } j \\ 0, & \text{otherwise} \end{cases}$$

$$U_{ij}^k \begin{cases} 1, & \text{if employee type } k \text{ in facility } i \text{ will not obtain the service} \\ 0, & \text{otherwise} \end{cases}$$

$$I_i \begin{cases} 1, & \text{if facility } i \text{ will be used as an onsite facility} \\ 0, & \text{otherwise} \end{cases}$$

$$J_i \begin{cases} 1, & \text{if facility } i \text{ will be used as a popup facility} \\ 0, & \text{otherwise} \end{cases}$$

$$K_i \begin{cases} 1, & \text{if 3rd party site } i \text{ will be used} \\ 0, & \text{otherwise} \end{cases}$$

$$X_{ij}^k, Y_{ij}^k, W_{ij}^k, U_i^k, J_i, K_i \in Z^{0,1}$$

In step 414, the cost function determined in step 412 is optimized. For example, a relative minima of the cost function defined in step 412 may be determined. According to aspects of the present disclosure, the cost function may be optimized using any relevant optimization algorithms, methods, heuristics, and the like (e.g., quantum optimization algorithms, combinatorial algorithms, iterative methods, gradient descent methods, convergence models, etc.). The optimized cost function may be confirmed in step 416, and, in step 418, the topology associated with the optimized cost function may be determined. The determined topology can specify where the services are to be provided to each demand (e.g., location, facility, etc.), the event/mechanism that will be hosted at each location (e.g., on-site, third party, hub and spoke, mobile, pop up, etc.), an assignment where each demand is to receive the services (e.g., location, date and time, etc.), and the like.

The determined topology may be presented (e.g., on client device 120) via a user interface, in step 420. Upon presentation of the topology, in step 422, it may be determined whether the topology has been accepted to be implemented for the provisioning of the service to the demand. If the topology has been accepted for implementation notifications can be generated and transmitted to the demand (e.g., the recipients of the service) and/or a portal through which recipients of the service (e.g., the demand) can access information associated with receiving of the service can be provided, as in steps 432 and 434, respectively. The notification and/or portal can provide information such as the date, time, location, etc. of the event to which the recipient has been assigned for receiving the service. Additionally, options can be provided if the recipient needs to modify the date, time, location, etc. where he/she is assigned to receive the service and/or if the service is no longer needed (e.g., the user received the service from another source, etc.).

Alternatively, if the topology is not accepted for implementation, it may be determined if there are changes to be made to the topology. If changes are to be made to the topology, the generated topology may be customized, as in step 426, which is discussed in further detail in connection with FIG. 9. If no further changes are to be made, it can be determined if other actions are to be taken in connection with the topology (step 428), such as saving the topology for later implementation, modification, etc., and any such actions can be taken in step 430 before process 400 completes.

Figure 5:
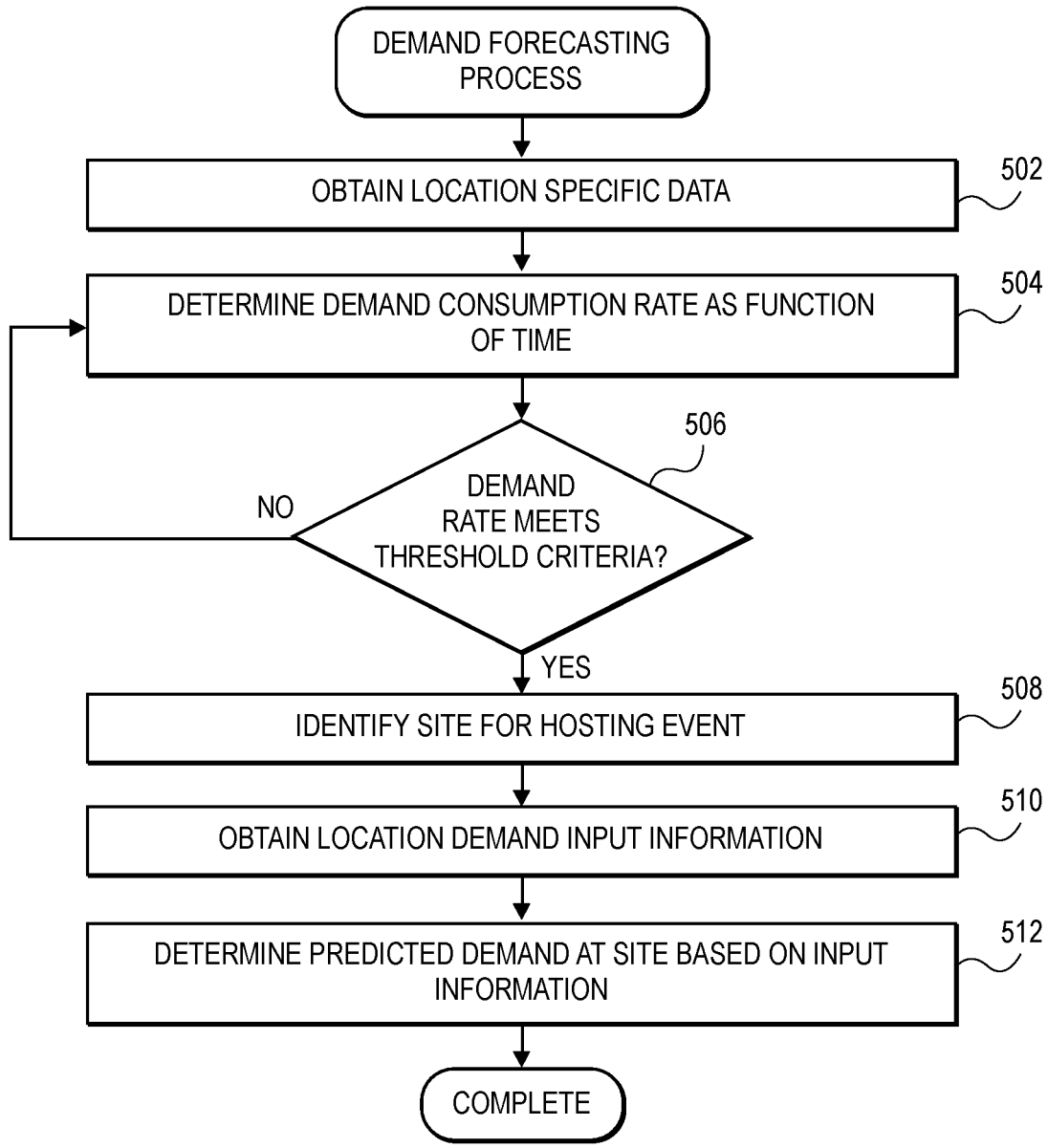
FIG. 5 is a flow diagram of an exemplary demand forecasting process, according to exemplary embodiments of the present disclosure.

FIG. 5 is a flow diagram of an exemplary process 500 for forecasting demand, according to exemplary embodiments of the present disclosure. For example, process 500 may be performed by one or more trained machine learning models (e.g., demand estimation engine 141) and may include determining a demand estimation model, which can include a demand threshold model and a demand model.

Process 500 may begin with step 502, where input data for each potential location for provisioning of services may be obtained. This may include, for example, recent data and/or trends associated with consumption of the service as a proportion of the population of the location and a rate of change of consumption of the service. In step 504, the location specific input data may be used to forecast a rate of growth of a proportion of the population who may consume the service as a function of time. For example, this may include deriving a rate of change based on recent data and/or trends and may forecast to approximate a rate of growth of a proportion of the population that may consume the service. Alternatively and/or in addition, the proportion of the population that is estimated to have consumed the service may be approximated using a sigmoid curve (e.g., an S-curve, etc.).

In step 506, it may be determined if the demand consumption rate meets a threshold criteria. For example, a threshold value for demand consumption may be determined, and the demand consumption rate may facilitate a prediction of a point in time at which the location is anticipated to achieve the threshold value. According to aspects of the present disclosure, the threshold criteria can include, for example, whether the location has the highest relative likelihood to achieve the threshold value, whether the location has the largest relative gap between the demand consumption rate relative to the threshold value may be selected, and the like.

Based on whether the threshold criteria have been met, the location may be identified as a location for hosting an event to provide the service, as in step 508. Next, location demand input information associated with the location identified in step 508 may be obtained, as in step 510. This can include information pertaining to the location, the community, event type, recent trends, location trends, and the like. Based on this information, the predicted demand at the location may be determined, as in step 512. According to embodiments of the present disclosure, the predicted demand at the location can facilitate determination of the mechanism and/or type of resources, as well as the number of resources, to be deployed at the location.

Figure 6:
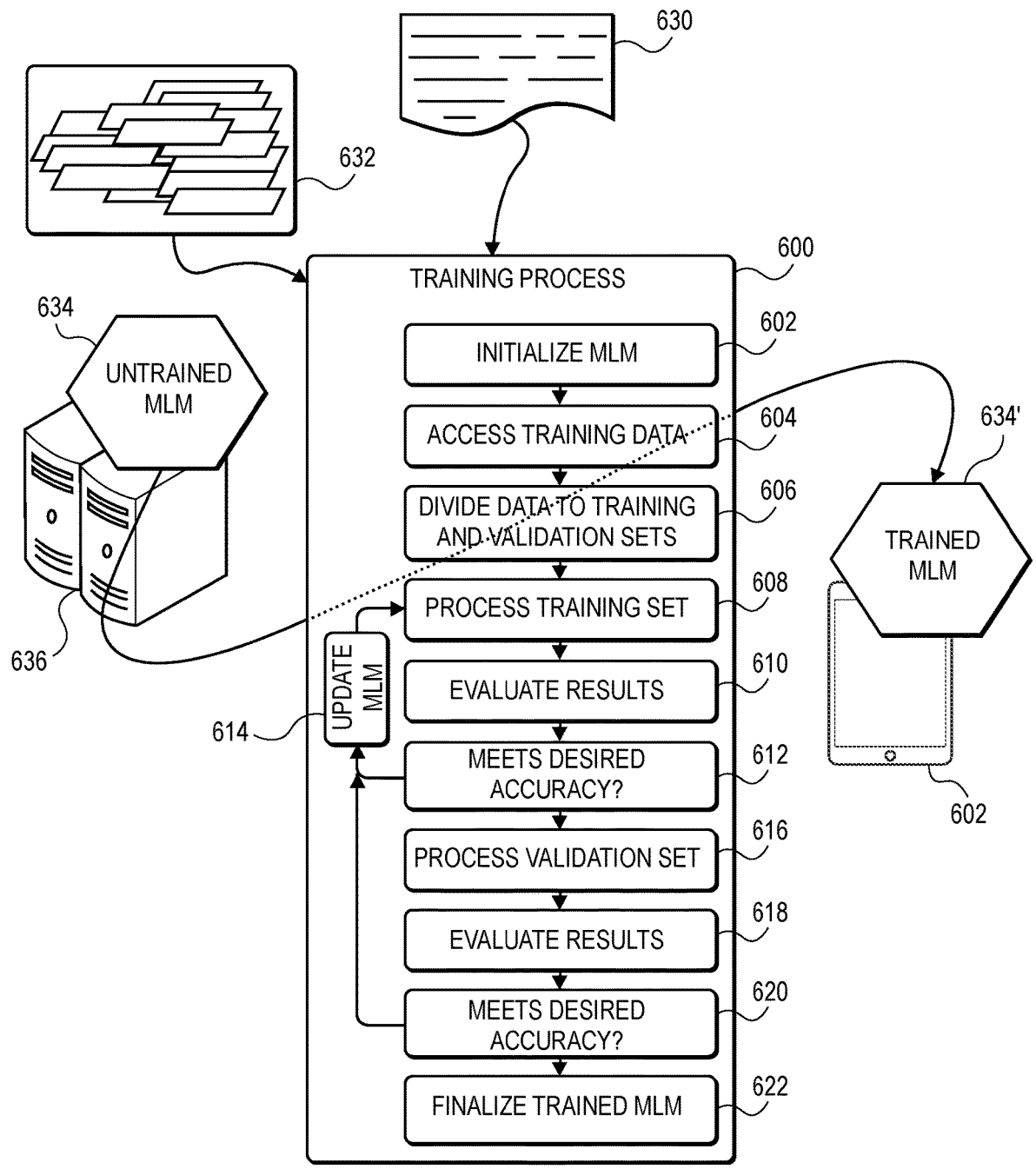
FIG. 6 illustrates an exemplary training process for training one or more machine learning systems, according to exemplary embodiments of the present disclosure.

FIG. 6 illustrates an exemplary training process 600 for training one or more machine learning models, according to exemplary embodiments of the present disclosure. According to certain embodiments of the present disclosure, process 600 may be employed to train demand estimation engine 141.

Training process 600 may be configured to train an untrained machine learning model 634 operating on a computer system 636 to transform untrained machine learning model 634 into trained machine learning model 634' that operates on the same or another computer system, such as computing resources 130. According to exemplary embodiments, demand estimation engine 141 may include trained machine learning model 634'.

In the course of training, as shown in the training process 600, at step 602, untrained machine learning model 634 may be initialized with training criteria 630 comprising one or more of static features, dynamic features, and processing features. At step 604 of training process 600, corpus 632 of training data is accessed. According to aspects of the present disclosure, the corpus of training data may be representative of the input data (e.g., recent data, location information, community information, event type information, recent trends, location trends, recent impactful news, etc.) that the resulting trained machine learning model 634' may receive. In connection with training demand estimation engine 141, the corpus of training data may include information relating to the potential locations and communities for provisioning of the service, recent trends and data, information relating to the service, information relating to the events to be held, and the like. In various embodiments, the training data is labeled training data, meaning that the actual results of processing of the data items of the corpus of training data (i.e., whether they are valid results or invalid results) are known.

In accordance with exemplary embodiments of the present disclosure, with corpus 632 of training data accessed, at step 606, the training data may be divided into training sets and validation sets. Generally, the items of data in the training set may be used to train untrained machine learning model 634 and the items of data in the validation set may be used to validate the training of the machine learning model. As those skilled in the art will appreciate, and as described below in regard to much of the remainder of training process 600, there are numerous iterations of training and validation that occur during the training of the machine learning model.

At step 608 of the training process, the data elements of the training set are processed, often in an iterative manner. Processing the data elements of the training set include capturing the processed results. After processing the elements of the training set, at step 610, the aggregated results of processing the training set are evaluated, and at step 612, a determination is made as to whether a desired accuracy level has been achieved. If the desired accuracy level is not achieved, in step 614, aspects of the machine learning model are updated in an effort to guide the machine learning model to generate more accurate results, and processing returns to step 608. Alternatively, if the desired accuracy level is achieved, the training process 600 may advance to step 616.

Similar to step 608, at step 616, the data elements of the validation set are processed, and the processing accuracy of this validation set is aggregated. At step 618, a determination can be made as to whether a desired accuracy level, in processing the validation set, has been achieved. At step 620, if the desired accuracy level has not been achieved, aspects of the machine learning model are updated, in step 614, in an effort to guide the machine learning model to generate more accurate results, and processing returns to step 608. Alternatively, if the desired accuracy level is achieved, the training process 600 advances to step 622.

At step 622, a finalized, trained machine learning model 634' is generated. Typically, though not exclusively, as part of finalizing the now-trained machine learning model 634', portions of the machine learning model that are included in the system during training for training purposes are extracted, thereby generating a more efficient trained machine learning model 634'. Further, the performance of trained machine learning model 634' may continuously be monitored and assessed. For example, the predicted demands provided by demand estimation engine 141 may be continuously compared against actual demands, and further training data may be generated and provided to further train the one or more trained machine learning models employed by demand estimation engine 141.

FIG. 7A is an illustration of an exemplary user interface 700, according to exemplary embodiments of the present disclosure. As shown in FIG. 7A, user interface 700 may present information associated with a topology for provisioning a service to a demand distributed over a geographic area in table form.

According to embodiments of the present disclosure, the topology may specify one or more different mechanisms and/or types of resources that may be employed to provision the service. For example, based on the geographic distribution of the customers, the service may be provided at customer sites, at one or more aggregated sites, and/or using third party providers. Alternatively and/or in addition to providing the service at the customer site, the service may also be provided via a mobile and/or "pop-up" type arrangement where in-house customer resources may be dispatched to a site (e.g., on-site at a customer site or a third-party site) to provide services. According to certain aspects, a "hub and spoke" model may be employed, where a primary service provider (e.g., at a customer site) may be considered to be a "hub" provides the service to "spoke" locations.

User interface 700 may present service events 702, 704, 706, and 708 defined by the exemplary topology, along with certain parameters associated with each service event. Although user interface 700 includes parameters such as the type of service event, the name of the location hosting the event, a minimum and maximum capacity, the ability to service demand from other locations, a base cost associated with the event, and a cost per person, user interface 700 may provide any other parameters that may be relevant to the topology, each event, the service being provided, and the like.

As shown in FIG. 7A, user interface 700 may indicate that the topology may include service event 702, which may be an onsite event hosted at Facility A, have a base cost of $1,000, a cost per demand of $45, and is able to service a maximum capacity of 500 people while being able to service demands from other locations. Similarly, user interface 700 may indicate that the topology may also include service event 704, which may be an onsite event hosted at Facility B, have a base cost of $1,500, a cost per demand of $45, and is able to service a maximum capacity of 10,000 people while not being able to service demands from other locations. User interface 700 may further indicate that the topology may also include service event 706, which may be hub and spoke event, have a base cost of $5,000, a cost per person of $50, and is able to service a maximum capacity of 2,500 people while not being able to service demands from other locations. Further, user interface 700 may also indicate that the topology may also include service event 708, which may be a third-party event hosted at Drugstore A and have a cost per person of $70.

FIG. 7B is an illustration of an exemplary user interface 750, according to exemplary embodiments of the present disclosure. As shown in FIG. 7B, user interface 750 may be presented to a user receiving a service (e.g., a demand via a user portal) that may be defined by a topology generated according to exemplary embodiments of the present disclosure.

According to embodiments of the present disclosure, user interface 750 may present certain information relevant to obtaining the service by a demand (e.g., customer). For example, user interface 750 may be presented to a user (e.g., via a portal on a client device) after a topology has been generated in connection with the provisioning of the service to the demand. Accordingly, the topology may specify the manner (e.g., a date, time, location, mechanism, etc.) through which each demand may receive the service. User interface 750 may present the user's assigned event 754 (e.g., Facility Z, located in Any Town, USA between September 21 and 24th), alternate events 756 at which the user may receive the service, and/or a user-supplied indication 752 of whether he/she has received the service. Accordingly, user interface 750 may facilitate access and management of obtaining the service by each demand.

User interface 750 may be provided to the user in addition to an alert and/or notification that may be sent to each user regarding obtaining of the service, which may be specified by a topology generated according to embodiments of the present disclosure. Additionally, user interface 750 may provide any other information regarding obtaining of the service that may be defined by the generated topology and/or relevant to obtaining of the service by each user.

Figure 8A:
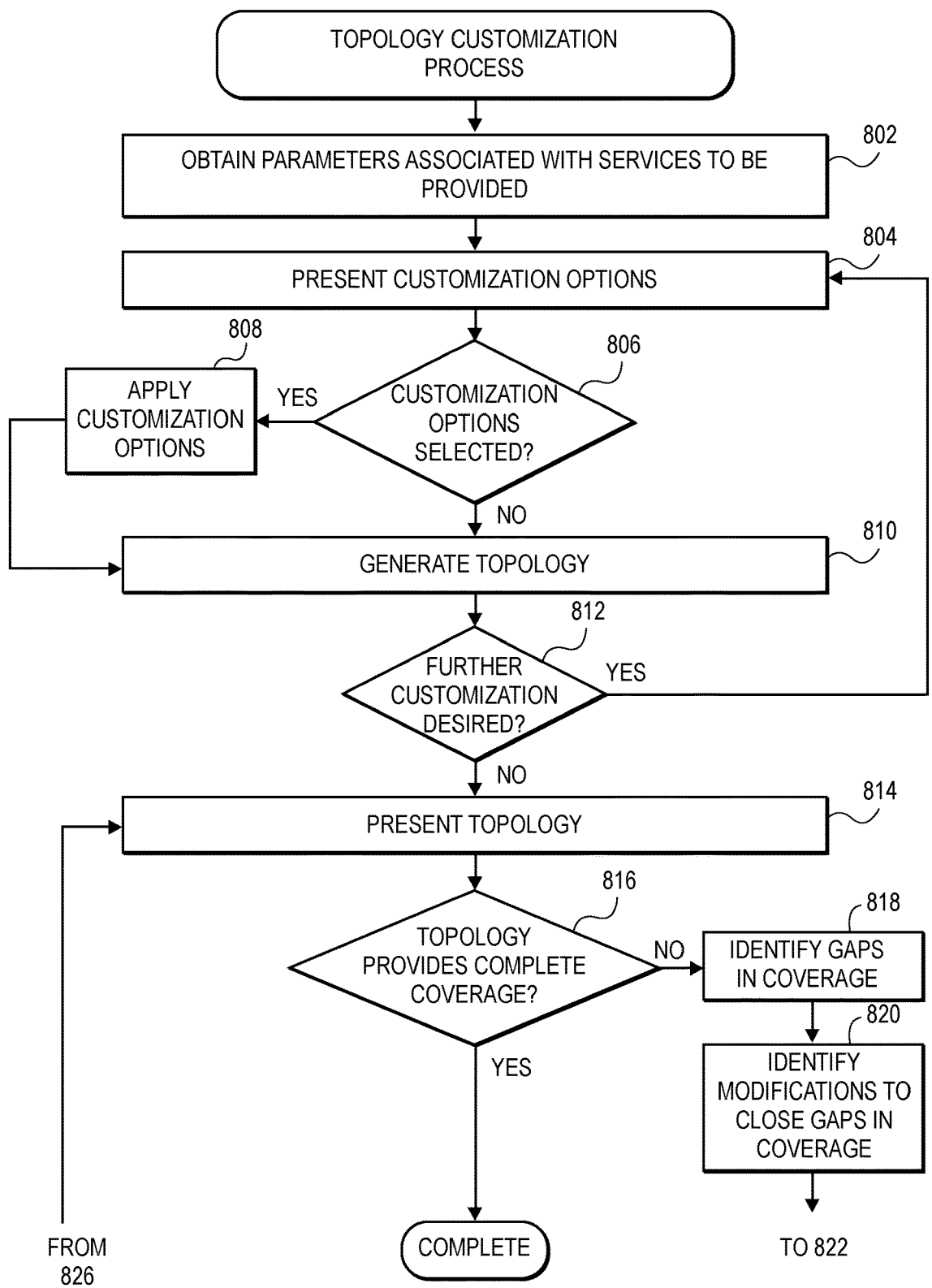
FIGS. 8A and 8B is a flow diagram of an exemplary topology customization process, according to exemplary embodiments of the present disclosure.
Figure 8B:
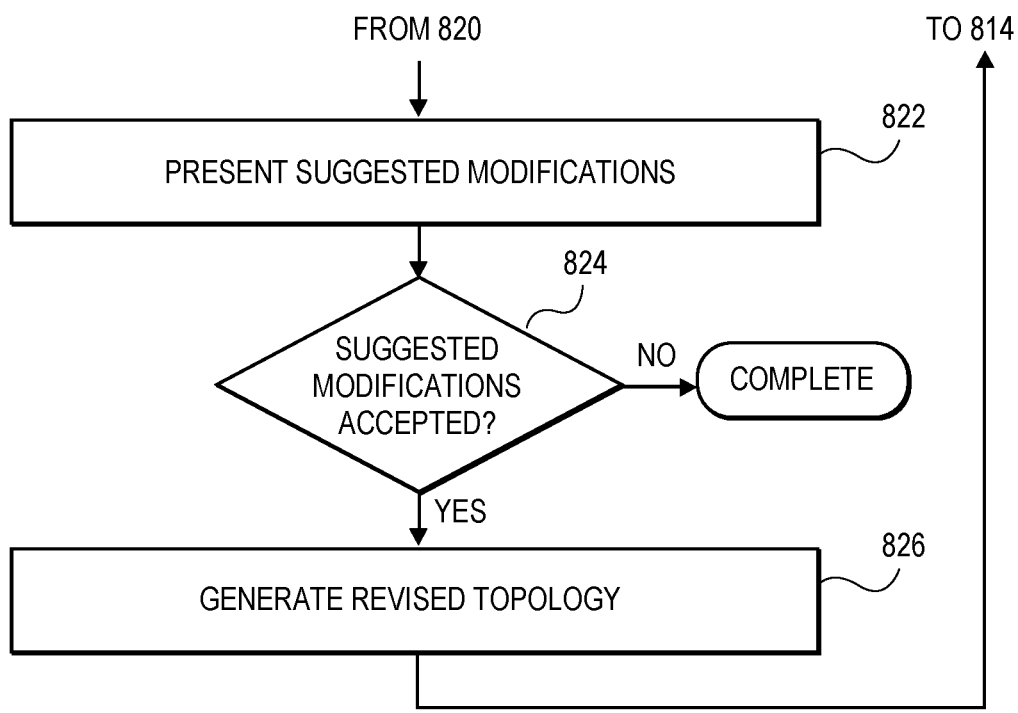

FIGS. 8A and 8B is a flow diagram of an exemplary process 800 for customizing a topology for delivering a service, according to exemplary embodiments of the present disclosure. For example, process 800 may be performed by topology generator 140 in generating a custom topology presenting a lowest relative cost for providing a service to a demand that may be distributed over a geographic area.

As shown in FIGS. 8A and 8B, process 800 may begin with obtaining parameters and constraints associated with the service to be provided, as in step 802. This may include, for example, obtaining information in connection with the locations of the demand, the density of the demands at the various locations, the distances between the locations, characteristics of the demand at the various locations, trends and characteristics of the community surrounding the various locations, the number and locations of the customers to be serviced, an expected value of the number of customers at each location that will utilize the service (e.g., based on the demand estimation model, etc.), the type of service each customer may be provided, the type of resources that may be employed to provide the service (e.g., in-house/on-site, mobile/"pop-up", third-party, etc.), any parameters and/or constraints associated with each type of resource (e.g., minimum capacity, maximum capacity, type(s) of service that can be performed, maximum travel distance, etc.), constraints associated with each customer (e.g., maximum travel distance, type of service required, etc.), geographical constraints (e.g., legal and/or regulatory restrictions, residency restrictions, etc.), costs associated with provisioning of the service to each customer (e.g., base costs, fixed costs, variable costs, cost of unperformed services, etc.), and the like.

In step 804, customization options may be presented. The customization options may include one or more of the parameters and constraints that may have been obtained in step 802. Accordingly, a user may be presented with the option to modify one or more of the parameters and/or constraints so as to generate a custom topology based on the modified values for the parameters and/or constraints. According to exemplary embodiments of the present disclosure, the customization options may be presented via a user interface, which is discussed in further detail herein in connection with FIG. 9.

It may then be determined if any customization options have been selected, as in step 806. If any parameters and/or constraints have been modified, the customization options may be applied, as in step 808. In step 810, a topology presenting a lowest relative cost for providing the service may be generated. The topology may be generated based on the obtained parameters and/or constraints, as well as any customization options that may have been provided and applied in step 808. As described herein, the topology may be generated based on an estimated demand, definition of a cost function, and optimization of the cost function.

In step 812, it may be determined if any further customization is desired. If further customization is desired, process 800 returns to step 804 such that further customization options are presented. If no further customization is desired, the generated topology is presented, as in step 814.

In step 816, it can be determined whether the topology provides complete coverage to offer the service to all the demands or if a gap in the coverage may exist. If the topology does not provide complete coverage, the gaps in the coverage may be identified in step 818. For example, any gap in coverage may be the result of one or more parameters and/or constraints (e.g., maximum travel distance, maximum costs, maximum capacities, etc.), which may have been established such that the generated topology does not provide coverage for all the demands distributed over the geographic area. Accordingly, suggested modifications to the one or more parameters and/or constraints to close the gap in coverage may be identified in step 820 and presented to the user in step 822. If the suggested modifications are accepted, as in step 824, a revised topology in view of the accepted modified parameters and/or constraints is generated in step 826, and the process returns to step 814 where the topology is again presented to the user. In the alternative, if the topology provides complete coverage and/or the suggested modifications are not accepted, process 800 may complete.

FIG. 9 is an illustration of an exemplary user interface 900, according to exemplary embodiments of the present disclosure. As shown in FIG. 9, user interface 900 may present a user interface through which a user may interact (e.g., via client device 120) to specify various parameters and/or constraints in generating a topology in connection with the provisioning of a service to demands distributed over a geographic area.

As shown in FIG. 9, user interface 900 may present various parameters and/or constraints that may be established in generating a topology for the provisioning a service. Although certain parameters and/or constraints are shown, any parameters and/or constraints that may be relevant to the service, the geographic area, the demand, etc. may be presented by user interface 900 for defining and/or customizing by a user.

For example, user interface 900 may allow a user to specify region 902 where the service will be provided. This may include, a city, a state, country, etc. Additionally, the user may indicate locations 904 where the service may be provided. For example, the user may specify certain facilities, etc. where the service may be provided. Further, the user may also specify service recipients 906 who may receive the service. This can include a subset of the population, certain employees, certain proportion of the population, etc.

Additionally, user interface 900 may specify service type 908, whether onsite hub and spoke 910 provisioning of services is permitted, whether non-onsite hub and spoke 912 provisioning of services is permitted, whether third-party providers 914 are to be included in the topology, and a maximum travel distance 916 the service recipients and/or hub and spoke service providers would be required to travel.

Figure 10:
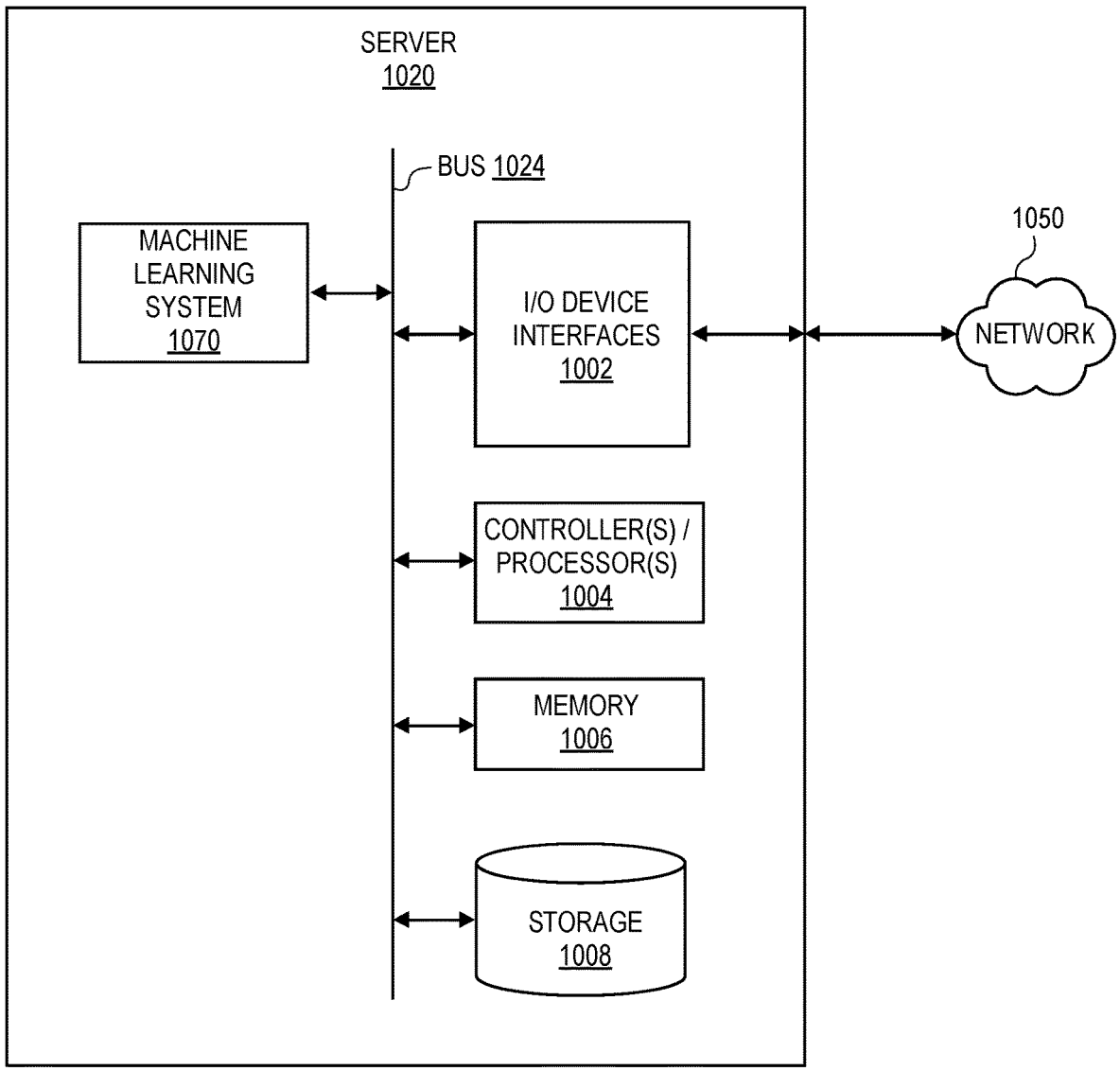
FIG. 10 is a block diagram illustration of an exemplary remote computing device, according to exemplary embodiments of the present disclosure.

FIG. 10 is a block diagram of an exemplary remote computing resource 1020, according to embodiments of the present disclosure.

FIG. 10 conceptually illustrates example components of a remote computing device, such as remote computing resource 1020 that may include and/or execute one or more of the machine learning models and/or training of ensembles of systems in accordance with described implementations. Multiple such remote computing resources 1020 may be included in the system, such as one remote computing resource 1020 for each machine learning model. In operation, each of these devices (or groups of devices) may include computer-readable and computer-executable instructions that reside on the respective remote computing resource 1020, as will be discussed further below.

Each of these remote computing resource 1020 may include one or more controller(s)/processor(s) 1004, that may each include a central processing unit (CPU) for processing data and computer-readable instructions, and memory 1006 for storing data and instructions of the respective device. Memories 1006 may individually include volatile random-access memory (RAM), non-volatile read only memory (ROM), non-volatile magnetoresistive (MRAM) and/or other types of memory. Each remote computing resource 1020 may also include data storage component 1008, for storing data, controller/processor-executable instructions, training data, distilled data samples, etc. Each data storage component 1008 may individually include one or more non-volatile storage types such as magnetic storage, optical storage, solid-state storage, etc. Each remote computing resource 1020 may also be connected to removable or external non-volatile memory and/or storage (such as a removable memory card, memory key drive, networked storage, etc.), internal, and/or external networks 1050 (e.g., the Internet) through respective input/output device interfaces 1002.

Computer instructions for operating each remote computing resource 1020 and its various components may be executed by the respective remote computing resource 1020's controller(s)/processor(s) 1004, using memory 1006 as temporary "working" storage at runtime. A server's computer instructions may be stored in a non-transitory manner in non-volatile memory 1006, storage 1008, or an external device(s). Alternatively, some or all of the executable instructions may be embedded in hardware or firmware on the respective device in addition to or instead of software.

Each remote computing resource 1020 includes input/output device interfaces 1002. A variety of components may be connected through the input/output device interfaces. Additionally, each remote computing resource 1020 may include address/data bus 1024 for conveying data among components of the respective server. Each component within remote computing resource 1020 may also be directly connected to other components in addition to (or instead of) being connected to other components across the remote computing resource 1020.

Each server may also include one or more machine learning systems 1070. According to exemplary embodiments of the present disclosure, machine learning systems 1070 may be employed by the various engines and classifiers (e.g., demand estimation engine 141). As discussed above, the machine learning systems 1070 may be trained to perform a variety of different processes, such as the processing of a transcript and generating various predictions, as discussed above.

The components of remote computing resource 1020, as illustrated in FIG. 10, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein. Additionally, with respect to the one or more methods or processes of the present disclosure described herein, including but not limited to the flow charts shown in FIGS. 4A-6 and 8A and 8B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Aspects of the disclosed apparatus, method, and system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two.

A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   generating, by one or more processors, a first plurality of training data that includes a plurality of information relating to at least one of locations, communities, event types, or trends for provisioning of a service;
   training, using the first plurality of training data by the one or more processors, a machine learning model to determine a demand estimation model that specifies a plurality of locations and a plurality of predicted demands for each of the plurality of locations;
   generating, by the one or more processors, a user interface configured to obtain a plurality of demand information and a plurality of parameters in connection with providing the service to a population distributed over a geographic area;
   causing, by the one or more processors, the user interface to be presented on a client device;
   receiving, by the one or more processors and via an interaction with the user interface, the plurality of demand information and the plurality of parameters;
   processing, using the trained machine learning model, the plurality of demand information and the plurality of parameters to generate a predicted demand estimation model;
   determining, by the one or more processors and based at least in part on the predicted demand estimation model, a plurality of locations at which to provide the service to the population based at least in part on a rate of change of consumption of the service relative to a threshold value;
   determining, by the one or more processors and based at least in part on the predicted demand estimation model, an estimated demand forecast for at least one location of the plurality of locations;
   determining, by the one or more processors and based at least in part on the plurality of parameters, a cost function representing a total cost for providing the service to the estimated demand forecast associated with the at least one location;
   optimizing, by the one or more processors, the cost function to determine an optimized cost function presenting a lowest relative total cost for providing the service to the estimated demand forecast associated with the at least one location;
   generating, by the one or more processors, a topology associated with the optimized cost function;
   generating, by the one or more processors, a second user interface presenting a representation of the topology, wherein the representation of the topology specifies a plurality of topology information associated with the topology and the plurality of topology information includes at least one of a capacity associated with the at least one location, a facility type associated with the at least one location, or an event type associated with the at least one location;
   causing, by the one or more processors, the second user interface to be presented on the client device;
   comparing, by the one or more processors, an actual demand associated with the at least one location to the estimated demand forecast;
   generating, by the one or more processors, a second plurality of training data based at least in part on the comparison of the actual demand associated with the at least one location to the estimated demand forecast; and
   updating, by the one or more processors, the trained machine learning model using the second plurality of training data.

2. The computer-implemented method of claim 1, wherein the at least one location includes an aggregation of demand.

3. The computer-implemented method of claim 1, wherein the plurality of parameters includes at least one of:
   one or more service providing mechanisms;
   a minimum capacity value;
   a maximum capacity value;
   a maximum travel distance;
   a demand type;
   a geographic constraint;
   a base cost value; or
   a per unit cost value.

4. The computer-implemented method of claim 1, wherein optimizing the cost function includes applying at least one of a heuristic analysis, an iterative method, a convergence model, or an optimization algorithm.

5. A computing system, comprising:
one or more processors; and
a memory storing program instructions that, when executed by the one or more processors, cause the one or more processors to at least:
generate a first plurality of training data that includes a plurality of information relating to at least one of locations, communities, event types, or trends for provisioning of a service;
train, using the first plurality of training data, a machine learning model to determine a demand estimation model that specifies a plurality of locations and a plurality of predicted demands for each of the plurality of locations;
generate a user interface configured to obtain a plurality of parameters associated with the service to be provided to a plurality of demands distributed across a geographic area;
cause the user interface to be presented on a client device;
receive, via an interaction with the user interface, the plurality of parameters;
process, using the trained machine learning model, the plurality of parameters to generate a predicted demand estimation model;
determine, based at least in part on the predicted demand estimation model, a plurality of locations, at which to provide the service to the plurality of demands, and a plurality of estimated demands for the plurality of locations based at least in part on a rate of change of consumption of the service relative to a threshold value;
determine, based at least in part on the plurality of parameters, a cost function representing a total cost for providing the service to the plurality of demands at the plurality of locations;
optimize the cost function to determine an optimized cost function presenting a lowest relative total cost for providing the service to the plurality of demands;
generate a topology associated with the optimized cost function defining a manner in which the service is provided to the plurality of demands distributed across the plurality of locations;
generate a second user interface presenting a representation of the topology, wherein the representation of the topology specifies a plurality of topology information associated with the topology and the plurality of topology information includes at least one of a capacity associated with the plurality of locations, a facility type associated with the plurality of locations, or an event type associated with the plurality of locations;
cause the second user interface to be presented on the client device;
compare a plurality of actual demands associated with the plurality of locations to the plurality of estimated demands;
generate a second plurality of training data based at least in part on the comparison of the plurality of actual demands associated with the plurality of locations to the plurality of estimated demands; and
update the trained machine learning model using the second plurality of training data.

6. The computing system of claim 5, wherein:
the program instructions that, when executed by the one or more processors, further cause the one or more processors to at least obtain a plurality of demand information associated with each of the plurality of demands distributed across the plurality of locations; and
the plurality of estimated demands is based at least in part on the plurality of demand information.

7. The computing system of claim 6, wherein:
the manner in which the service is provided specifies that a service event of a first type is to be hosted at a first location from the plurality of locations; and
the predicted demand estimation model includes a demand model, and the first type is determined based at least in part on the demand model.

8. The computing system of claim 6, wherein:
the manner in which the service is provided specifies that a service event is to be hosted at a first location from the plurality of locations; and
the predicted demand estimation model includes a demand threshold model, and the first location is determined based at least in part on the demand threshold model.

9. The computing system of claim 8 wherein:
the demand threshold model includes an estimate of when a proportion of a demand associated with each of the plurality of locations will exceed the threshold value; and
the first location is determined based at least in part on the estimate.

10. The computing system of claim 5, wherein the manner in which the service is provided to the plurality of demands specifies a corresponding location from the plurality of locations where each of the plurality of demands is to receive the service.

11. The computing system of claim 10, wherein the program instructions that, when executed by the one or more processors, further cause the one or more processors to at least:
generate and transmit a notification presenting the corresponding location to each of the plurality of demands; or
present, via the second user interface, the corresponding location to each of the plurality of demands.

12. The computing system of claim 5, wherein the manner in which the service is provided to the plurality of demands specifies a service type of each of a plurality of service events to be hosted at at least one of the plurality of locations.

13. The computing system of claim 5, wherein optimization of the cost function includes applying at least one of a heuristic analysis, an iterative method, a convergence model, or an optimization algorithm.

14. A computer-implemented method, comprising:
generating, by one or more processors, a first plurality of training data that includes a plurality of information relating to at least one of locations, communities, event types, or trends for provisioning of a service;
training, using the first plurality of training data by the one or more processors, a machine learning model to determine a demand estimation model that specifies a plurality of locations and a plurality of predicted demands for each of the plurality of locations;
presenting, on a client device, a user interface providing a plurality of user-selectable parameters relating to providing of the service to a plurality of demands distributed across a geographic area and configured to allow a user to specify selections corresponding to the plurality of user-selectable parameters;

receiving, via the client device, an interaction with the user interface indicating a plurality of selections corresponding to the plurality of user-selectable parameters;

processing, using the trained machine learning model, the plurality of selections to generate a predicted demand estimation model;

determining, by the one or more processors and based at least in part on the predicted demand estimation model, the plurality of selections, and a rate of change of consumption of the service relative to a threshold value, a first plurality of locations at which to provide the service to the plurality of demands and a plurality of estimated demands at each of the first plurality of locations;

processing, by the one or more processors, the plurality of selections to generate a cost function representing a total cost to provide the service to the plurality of demands distributed across the first plurality of locations;

optimizing, by the one or more processors, the cost function to determine an optimized cost function presenting a lowest relative total cost for providing the service to the plurality of demands;

generating, by the one or more processors, a topology associated with the optimized cost function specifying a plurality of service events to be hosted at a second plurality of locations from the first plurality of locations and a corresponding location from the second plurality of locations where each of the plurality of demands is to obtain the service;

generating, by the one or more processors, a second user interface presenting a representation of the topology, wherein the representation of the topology specifies a plurality of topology information associated with the topology and the plurality of topology information includes at least one of a capacity associated with the first plurality of locations, a facility type associated with the first plurality of locations, or an event type associated with the first plurality of locations;

causing, by the one or more processors, the second user interface to be presented on the client device;

comparing, by the one or more processors, a plurality of actual demands associated with the first plurality of locations to the plurality of estimated demands;

generating, by the one or more processors, a second plurality of training data based at least in part on the comparison of the actual demand associated with the at least one location to the estimated demand forecast; and updating, by the one or more processors, the trained machine learning model using the second plurality of training data.

15. The computer-implemented method of claim 14, further comprising:

obtaining a plurality of demand information associated with each of the plurality of demands distributed across the first plurality of locations;

wherein:

processing, using the trained machine learning model, the plurality of selections to generate the predicted demand estimation model further includes processing the plurality of demand information; and the predicted demand estimation model includes an estimated demand model;

the estimated demand model includes a threshold demand model and a demand model;

determining the second plurality of locations from the first plurality of locations is based at least in part on the threshold demand model; and determining the plurality of service events is based at least in part on the demand model.

16. The computer-implemented method of claim 15, wherein the demand threshold model for each of the first plurality of locations includes an estimate of when a proportion of a demand associated with the location will exceed the threshold value.

17. The computer-implemented method of claim 14, further comprising:

determining a gap in coverage presented by the generated topology;

determining that the gap in coverage is a result of at least one of the plurality of user-selectable parameters;

determining a suggested modification to the at least one of the plurality of user-selectable parameters;

generating a modified cost function based at least in part on the suggested modification;

optimizing the modified cost function to determine a modified optimized cost function; and generating a modified topology associated with the optimized modified cost function.

18. The computer-implemented method of claim 14, further comprising:

obtaining, via the client device, a second interaction with the second user interface;

presenting, on the client device, a third user interface providing a second plurality of user-selectable parameters relating to providing of a modified service to the plurality of demands distributed across the first plurality of locations;

receiving, via the client device, a third interaction with the third user interface indicating a second plurality of selections corresponding to the second plurality of user-selectable parameters;

processing the plurality of selections to generate a modified cost function representing a modified total cost to provide the modified service to the plurality of demands distributed across the first plurality of locations;

optimizing the modified cost function to determine an optimized modified cost function presenting a lowest relative modified total cost for providing the modified service to the plurality of demands;

generating a modified topology associated with the optimized modified cost function specifying a plurality of modified service events to be hosted at a third plurality of locations from the first plurality of locations and a corresponding location from the third plurality of locations where each of the plurality of demands is to obtain the third service; and presenting, on the client device, a second representation of the third topology.

* * * * *